(12) United States Patent
Park et al.

(10) Patent No.: US 10,641,883 B2
(45) Date of Patent: May 5, 2020

(54) PULSE RADAR DEVICE AND OPERATING METHOD THEREOF

(71) Applicant: Electronics and Telecommunications Research Institute, Daejeon (KR)

(72) Inventors: Pil Jae Park, Daejeon (KR); Seong-Do Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 340 days.

(21) Appl. No.: 15/681,877

(22) Filed: Aug. 21, 2017

(65) Prior Publication Data

US 2018/0059232 A1 Mar. 1, 2018

(30) Foreign Application Priority Data

Aug. 31, 2016 (KR) .......................... 10-2016-0111998
Mar. 30, 2017 (KR) .......................... 10-2017-0041064

(51) Int. Cl.
| | | |
|---|---|---|
| *G01S 13/526* | (2006.01) | |
| *G01S 7/285* | (2006.01) | |
| *G01S 7/282* | (2006.01) | |
| *G01S 7/292* | (2006.01) | |

(Continued)

(52) U.S. Cl.
CPC ............ *G01S 13/526* (2013.01); *G01S 7/282* (2013.01); *G01S 7/285* (2013.01); *G01S 7/2923* (2013.01); *G01S 7/4866* (2013.01); *G01S 13/12* (2013.01)

(58) Field of Classification Search
CPC combination set(s) only.
See application file for complete search history.

(56) References Cited

U.S. PATENT DOCUMENTS

| | | | |
|---|---|---|---|
| 3,755,811 A | * | 8/1973 | Breckman ............... G01S 13/79 342/30 |
| 5,805,110 A | | 9/1998 | McEwan |
| 7,551,703 B2 | | 6/2009 | McEwan |

(Continued)

FOREIGN PATENT DOCUMENTS

JP  2006234474 A  *  9/2006

OTHER PUBLICATIONS

Anh Tuan Phan et al., "Low-Power Sliding Correlation CMOS UWB Pulsed Radar Receiver for Motion Detection", Circuit and Systems, 2009 ISCAS, pp. 1541-1544, May 2009.

(Continued)

*Primary Examiner* — Mamadou L Diallo
(74) *Attorney, Agent, or Firm* — Rabin & Berdo, P.C.

(57) ABSTRACT

Provided is a pulse radar device including: a TX unit configured to emit a TX pulse according to a single TX clock signal; a multiple-RX units configured to receive echo pulses received through a plurality of RX antennas according to multiple RX clock signals; a pulse radar driving unit configured to generate the single TX clock signal and the multiple RX clock signals using a reference clock signal. The pulse radar driving unit provides the single TX clock signal and the multiple RX clock signals for the TX unit and the multiple-RX unit. The pulse radar driving unit adjusts an RX clock-to-clock delay that is the delay between the multiple RX clock signals so as to adjust a directivity of the multiple-RX unit, and a TX-to-RX delay between the single TX clock signal and the multiple RX clocks signals so as to adjust a detection range.

19 Claims, 17 Drawing Sheets

(51) Int. Cl.
  *G01S 7/4865*  (2020.01)
  *G01S 13/12*  (2006.01)

(56) References Cited

U.S. PATENT DOCUMENTS

| | | | |
|---|---|---|---|
| 7,675,459 B2 | 3/2010 | Yoshimura | |
| 8,737,554 B2 | 5/2014 | Kim et al. | |
| 2004/0061639 A1* | 4/2004 | Voigtlaender | G01S 13/284 342/70 |
| 2006/0274871 A1* | 12/2006 | Griessbaum | G01F 23/284 375/354 |
| 2007/0024493 A1* | 2/2007 | Ikeda | G01S 7/288 342/70 |
| 2013/0002329 A1* | 1/2013 | Murofushi | G01S 7/032 327/231 |
| 2013/0162465 A1* | 6/2013 | Mukai | G01S 7/282 342/195 |
| 2014/0354469 A1* | 12/2014 | Park | G01S 7/28 342/195 |
| 2018/0024234 A1* | 1/2018 | Ishida | G01S 7/02 342/152 |
| 2018/0074181 A1* | 3/2018 | Kishigami | G01S 7/282 |
| 2018/0113193 A1* | 4/2018 | Huemer | G01S 7/038 |

OTHER PUBLICATIONS

Michael Yan Wah Chia et al., "Electronic Beam-Steering Design for UWB Phased Array", IEEE Transactions on Microwave Theory and Techniques, vol. 54, No. 6, pp. 2431-2438, Jun. 2006.

* cited by examiner

TxCLK_SEQ_3  Simultaneous Application of all TX Clocks of TxCLK_1, TxCLK_2 ···, TxCLK_N
$\delta 3 = 0$

US 10,641,883 B2

PULSE RADAR DEVICE AND OPERATING METHOD THEREOF

CROSS-REFERENCE TO RELATED APPLICATIONS

This U.S. non-provisional patent application claims priority under 35 U.S.C. § 119 of Korean Patent Application Nos. 10-2016-0111998, filed on Aug. 31, 2016, and 10-2017-0041064, filed on Mar. 30, 2017, the entire contents of which are hereby incorporated by reference.

BACKGROUND

The present disclosure relates to a radar device, and more particularly, to a pulse radar device using multiple clock signals and an operating method thereof.

A pulse radar device emits repetitively generated transmission (TX) pulses in a specific beam pattern. In addition, the pulse radar device receives a returned echo signal that is reflected by a target, and acquires information about the target. Typically, the pulse radar device receives an echo signal returned from a certain range where a target may be found out. A pulse radar device of a range gating type may receive a reflection signal in a specific range by changing a delay with provision of delay elements in a radar receiver. TX and reception (RX) directivity controls for the pulse radar device may be realized through a phase delay element capable of changing phases. When the phase delay element is used, a radar system becomes more complex and larger. Accordingly, the cost of the radar system rises. In order to configure the above-described pulse radar system with an on-chip radar device, it is necessary to realize on-chip technologies that achieve the TX and RX directivities and control the range of a target.

SUMMARY

The present disclosure herein provides a pulse radar capable of adjusting a directivity of a transmitter or a receiver using a clock signal.

The present disclosure also provide a method and device for controlling the magnitude of a time delay between multiple transmission (TX) clock signals, a time delay between multiple reception (RX) clock signals, or a time delay between a TX clock signal and a RX clock signal (i.e., a TX-to-RX delay).

An embodiment of the inventive concept provides a pulse radar device including: a multiple-TX unit configured to emit TX pulses through a plurality of TX antennas according to multiple-TX clock signals; a multiple-RX unit configured to receive echo signals received through a plurality of RX antennas according to multiple RX clock signals; and a pulse radar driving unit configured to generate the multiple TX clock signals and the multiple RX clock signals using a reference clock signal. The pulse radar driving unit provides the multiple TX clock signals and the multiple RX clock signals for the multiple-TX unit and the multiple-RX unit, respectively. Thus, the pulse radar driving unit adjusts a delay between the multiple TX clock signals so as to adjust a directivity of the TX pulse. The pulse radar driving unit adjusts a delay between the multiple RX clock signals so that the multiple-RX unit has a directivity to receive the echo signals. The pulse radar driving unit adjusts a TX-to-RX delay, which is a delay between the multiple TX clock signals and the multiple RX clock signals, so as to select a detection range.

In an embodiment, the pulse radar driving unit may change a sequence of the delays to control the directivity of the radar and selection of the detection range at the same time.

In an embodiment, the delay may include a delay between the multiple TX clock signals, a delay between the RX clock signals, and a delay between the multiple TX clock signals and the multiple RX clock signals.

In an embodiment of the inventive concept, a method for operating a pulse radar device that receives echo signals using a plurality of RX antennas includes the following steps of: setting the magnitude of a TX-to-RX delay between a TX clock signal and multiple RX clock signals so as to adjust the range of a target; setting the magnitude of an RX clock-to-clock delay between the RX clock signals so as to have a directivity reception of the echo signals; performing a radar operation according to the TX-to-RX delay and RX clock-to-clock delay; and analyzing at least one of a position, a distance, or a type of a target using results of the radar operation.

In an embodiment of the inventive concept, a pulse radar device includes: a TX unit configured to emit a TX pulse according to a single TX clock signal; a multiple-RX unit configured to receive echo pulses received through a plurality of RX antennas according to multiple RX clock signals; and a pulse radar driving unit configured to generate the single TX clock signal and the multiple RX clock signals using a reference clock signal. The pulse radar driving unit provides the single TX clock signal and the multiple RX clock signals for the TX unit and the multiple-RX unit, respectively. The pulse radar driving unit adjusts an RX clock delay between the multiple RX clock signals (i.e., RX clock-to-clock delay) so that the multiple-RX unit has a directivity to receive the echo pulses. The pulse radar driving unit adjusts a TX-to-RX delay between the single TX clock signal and the multiple RX clock signals so as to adjust a detection range.

In an embodiment of the inventive concept, a pulse radar device includes: a multiple-TX unit configured to emit TX pulses according to multiple TX clock signals; an RX unit configured to receive an RX pulse that is received through a single receiver according to a single RX clock signal; a pulse radar driving unit configured to generate the multiple TX clock signals and the single RX clock signal using a reference clock signal. The pulse radar driving unit provides the multiple TX clock signals and the single RX clock signal for the multiple-TX unit and the single RX unit, respectively. The pulse radar driving unit adjusts a TX clock delay between the multiple TX clock signals so as to adjust a directivity of the TX pulses, and a TX-to-RX delay between the multiple TX clock signals and the single RX clock signal so as to adjust a detection range.

In an embodiment of the inventive concept, a pulse radar device includes a TX unit configured to emit a TX pulse according to a TX clock signal; an RX unit configured to receive an echo pulse according to an RX clock signal; and a pulse radar driving unit configured to generate the TX clock signal and the RX clock signal using a reference clock signal. The pulse radar driving unit provides the TX clock signal and the RX clock signal for the TX unit and the RX unit, respectively. The pulse radar driving unit adjusts a TX clock-to-clock delay of the TX clock signals so as to adjust a directivity of the TX pulse.

Realization of the above-described transmitter and receiver may be integrated using integrated circuit technology. In addition, a pulse radar device of the present inventive concept may be realized using unit components on a board.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

The foregoing description and the following detailed description are all illustrative of the present inventive concept, an additional description of the claimed invention should be considered to be provided. It is to be understood that both the foregoing description and the following detailed description are merely illustrative examples of various aspects and embodiments, and are intended to provide an overview or framework for understanding the nature and character of the claimed aspects and embodiments. Accordingly, the present invention is not limited to the following embodiments but embodied in other types. Rather, these embodiments are provided so that this disclosure will be thorough and complete, and will fully convey the scope of the present invention to those skilled in the art. Throughout this specification, like numerals refer to like elements.

Throughout this specification, when an element is referred to as "including" a component, it does not preclude another component but may further include the other component unless the context clearly indicates otherwise. In addition, an embodiment described and exemplified herein also includes a complementary embodiment thereof. Hereinafter, embodiments of the present disclosure are described in detail with reference to the accompanying drawings.

Figure 1:
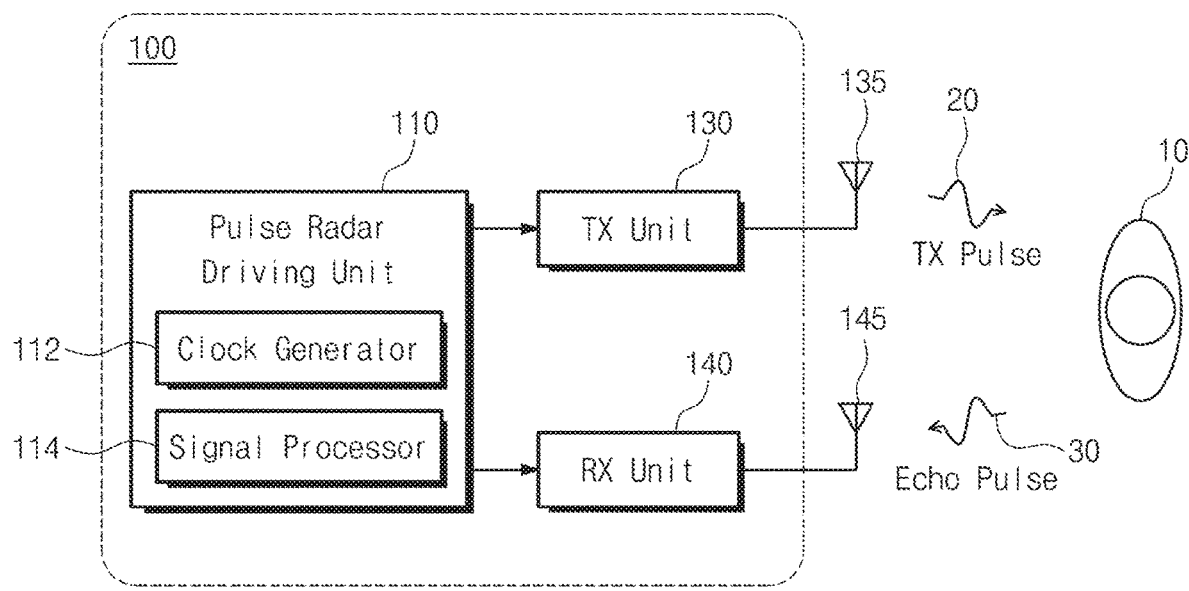
FIG. 1 illustrates a pulse radar device of an embodiment of the present inventive concept.

FIG. 1 illustrates a pulse radar device of an embodiment of the present inventive concept. Referring to FIG. 1, the pulse radar device, 100, of the present inventive concept includes a pulse radar driving unit, 110, a TX unit, 130, a TX antenna, 135, an RX unit, 140, and an RX antenna, 145. The pulse radar driving unit, 110, may include a clock generator, 112, and a signal processor, 114, for controlling a directivity of a TX pulse, 20, and a directivity of the RX unit, 140, and selecting a detection range.

The pulse radar device, 100, may emit the TX pulse, 20, using the TX antenna, 135. In order to generate the TX pulse, 20, the pulse radar device, 100, may use, as a TX trigger signal, a TX clock signals TxCLK generated by the clock generator, 112. In response to the TX trigger signal, the TX unit, 130, may generate to emit the TX pulse, 20, to a target, 10, through the TX antenna, 135. Through the TX unit, 130, and the TX antenna, 135, the TX pulse, 20, is emitted in a pulse repetition period corresponding to the TX clock signal, TxCLK. When the TX antenna, 135, includes multiple TX antennas, the pulse radar device, 100, may control the directivity of the TX pulse, 20, according to the TX clock signals, TxCLK, generated by the clock generator, 112. In other words, the pulse radar driving unit, 110, may change a delay between TX clock signals (hereinafter 'TX clock-to-clock delay') provided to the TX unit, 130, to adjust the directivity of the TX pulse, 20.

The pulse radar device, 100, may receive an echo pulse, 30, from an antenna array, 145, according to an RX clock signal, RxCLK, generated by the clock generator, 112. The RX clock signals, RxCLK, are provided to the RX unit, 140, for controlling the directivity of the RX unit, 140. In addition, the pulse radar driving unit, 110, may change a delay between RX clock signals (hereinafter 'RX clock-to-clock delay') to adjust the directivity of the RX unit, 140.

Furthermore, the pulse radar device, 100, may adjust the magnitude of a delay between the TX clock signal, TxCLK, and the RX clock signal, RxCLK, (hereinafter 'TX-to-RX delay') to adjust a range for scanning a target, 10. The pulse radar device, 100, may change the delay between the TX clock signal, TxCLK, and the RX clock signal, RxCLK, generated from the clock generator, 112, to sequentially scan a specific distance interval in a specific direction. Alternatively, the pulse radar device, 100, may fix the delay between the TX clock signal, TxCLK, and the RX clock signal, RxCLK, generated from the clock generator, 112, to repetitively scan a specific target in a specific direction. When a specific range is repetitively scanned, a signal-to-noise ratio (SNR) of the RX pulse may be enhanced.

The above-described pulse radar device, 100, including the clock generator, 112, of the present inventive concept may change the TX clock-to-clock delay to adjust the directivity of the TX unit, 130. In addition, the pulse radar device, 100, may change the RX clock-to-clock delay to adjust the directivity of the RX unit, 140. In addition, the pulse radar device, 100, may change the TX-to-RX delay to adjust or select the detection range of radar.

Figure 2:
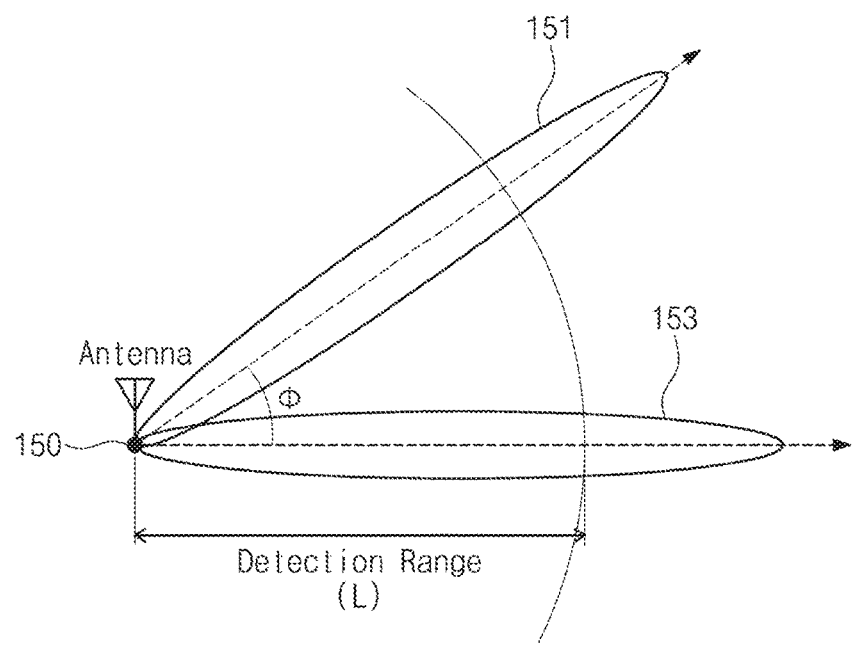
FIG. 2 exemplarily illustrates a beam pattern directivity and range selection characteristics of a pulse radar device of an embodiment of the present inventive concept.

FIG. 2 exemplarily illustrates a beam pattern directivity and range selection characteristics of a pulse radar device of the embodiment of the present inventive concept. Referring to FIG. 2, an orientation angle φ of beam patterns, 151 and 153, of the antenna, 150, of the present inventive concept may be achieved by changing the delay between clock signals generated by the clock generator, 112 (see FIG. 1). In addition, selection of the detection range L may be realized through selection of the magnitude of the TX-to-RX delay. Description in detail will be provided as the following.

It is assumed that the beam pattern, 153, is perpendicular to a plane of the antenna, 150. To scan a certain direction, for example, in an angle, φ, the beam pattern, 151, of the TX pulse, 20, (see FIG. 1) has the orientation angle, φ, from the beam pattern, 153. To achieve this, the pulse radar device, 100, of the present inventive concept adjusts a delay between TX trigger signals applied to the TX unit, 130. In other words, the magnitude of the TX clock-to-clock delay for each of the TX trigger signals is adjusted to set the orientation angle, φ, of the TX pulse, 20.

In order to control the directivity of the RX unit, 140 (see FIG. 1), the pulse radar device, 100, adjusts the RX clock-to-clock delay for receiving the echo pulse, 30. In other words, a delay between clock signals of the RX unit, 140, is adjusted to control the directivity of the RX unit, 140. Moreover, the pulse radar device, 100, may set the magnitude of the TX-to-RX delay for selecting the detection range L.

Here, it would be well understood to those skilled in the art that the orientation angle, φ, may be an azimuth angle or an elevation angle.

Figure 3:
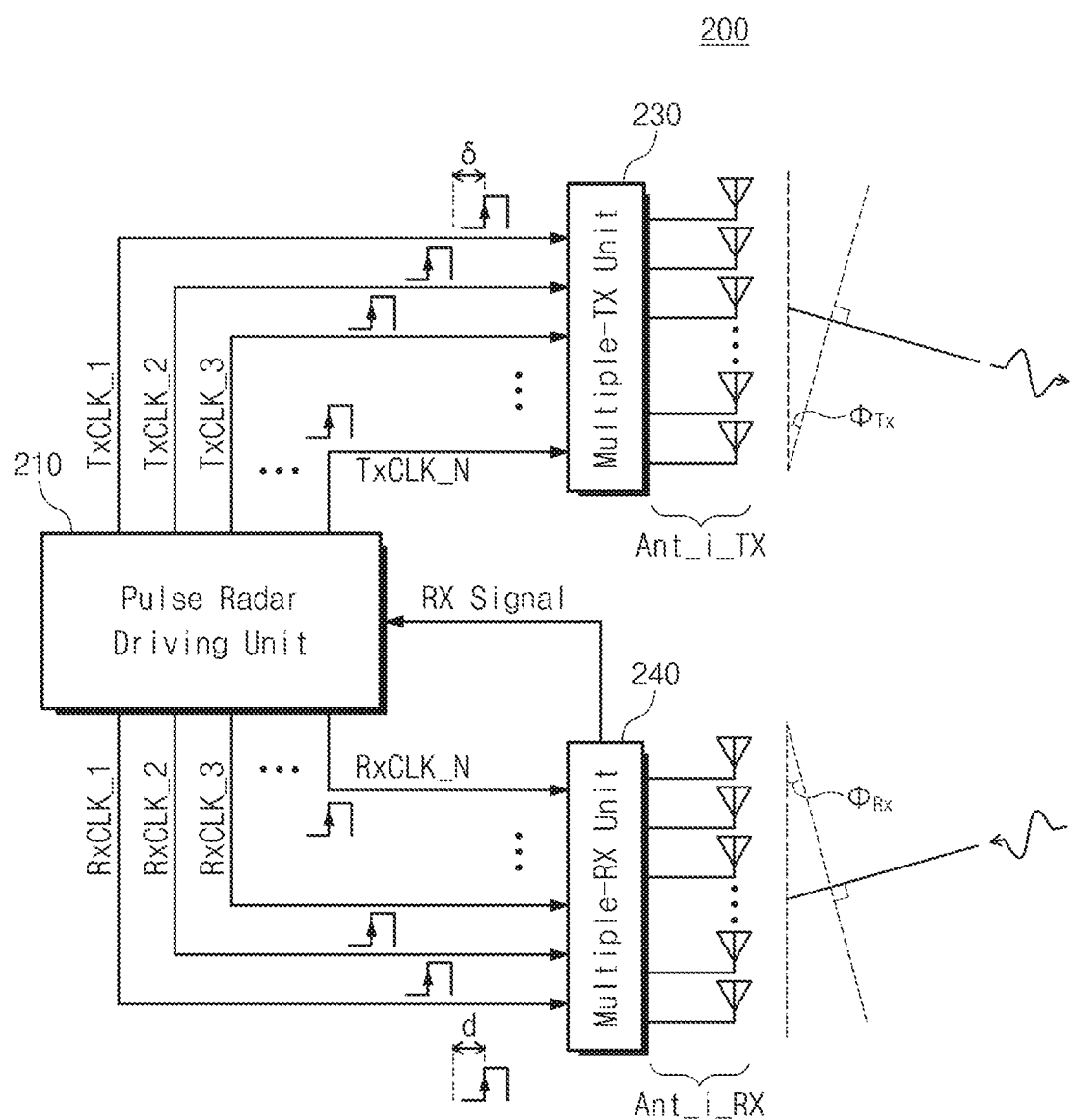
FIG. 3 is a block diagram showing a pulse radar device according to an embodiment of the present inventive concept.

FIG. 3 is a block diagram showing a pulse radar device according to an embodiment of the present inventive concept. Referring to FIG. 3, the pulse radar device, 200, may include a pulse radar driving unit, 210, a multiple-TX unit, 230, and a multiple-RX unit 240.

The pulse radar driving unit, 210, may provide the multiple-TX unit, 230, with TX clock signals (i.e., TxCLK_1, TxCLK_2, . . . , and TxCLK_N), wherein N is a natural number. The pulse radar driving unit, 210, may generate a plurality of TX clock signals (i.e., TxCLK_1, TxCLK_2, . . . , and TxCLK_N) in a time interval of a TX clock-to-clock delay, δ, by utilizing a source clock signal (or a reference clock signal). In other words, a second TX clock signal, TxCLK_2, is a clock signal delayed by the TX clock-to-clock delay, δ, in comparison to a first TX clock signal, TxCLK_1. A third TX clock signal, TxCLK_3, is a clock signal delayed by the TX clock-to-clock delay, δ, in comparison to the second TX clock signal, TxCLK_2. Here, the TX clock-to-clock delay, δ, may be adjusted to various values. In other words, the TX clock-to-clock delay, δ, may be a positive number, 0, or a negative value. Thus, the TX clock signals (i.e., TxCLK_1, TxCLK_2, . . . , and TxCLK_N) may have a reverse sequence in a time interval of the TX clock-to-clock delay, δ.

The plurality of TX clock signals (i.e., TxCLK_1, TxCLK_2, . . . , and TxCLK_N), which have the TX clock-to-clock delay, δ, are transferred to the multiple-TX unit, 230. The multiple-TX unit, 230, is provided with a pulse generator for generating a TX pulse to each of TX antennas. Each of the plurality of TX clock signals (i.e., TxCLK_1, TxCLK_2, . . . , and TxCLK_N) may be provided as a TX trigger signal to a corresponding pulse generator. Then, TX antennas, Ant_Tx, respectively emit TX pulses corresponding to respective periods of the TX clock signals (i.e., TxCLK_1, TxCLK_2, . . . , and TxCLK_N). At this point, an orientation angle, $\varphi_{Tx}$, of a beam formed by the TX pulse emitted by each of the TX antennas, Ant-Tx, may be defined by the magnitude of the TX clock-to-clock delay, δ. In other words, the directivity of the TX pulse is determined by the magnitude of the TX clock-to-clock delay, δ.

The pulse radar driving unit 210 may provide the multiple-RX unit, 240, with RX clock signals (i.e., RxCLK_1, RxCLK_2, . . . , and RxCLK_N), wherein N is a natural number. The pulse radar driving unit, 210, may generate the multiple RX clock signals (i.e., RxCLK_1, RxCLK_2, . . . , and RxCLK_N) in a time interval of the RX clock-to-clock delay, d, by utilizing a source clock. In other words, like the TX clock signals, a second RX clock signal, RxCLK_2, is a clock signal delayed by the RX clock-to-clock delay, d, in comparison to a first RX clock signal, RxCLK_1. A third RX clock signal, RxCLK_3, is a clock signal delayed by the RX clock-to-clock delay, d, in comparison to the second RX clock signal, RxCLK_2.

Here, the RX clock-to-clock delay, d, may be adjusted with various values like the TX clock-to-clock delay, δ. In other words, the RX clock-to-clock delay, d, may be a positive, 0, or a negative value. Thus, the RX clock signals (i.e., RxCLK_1, RxCLK_2, . . . , and RxCLK_N) may have a reverse sequence in a time interval of the RX clock-to-clock delay, d.

The multiple RX clock signals (i.e., RxCLK_1, RxCLK_2, . . . , and RxCLK_N), which have the RX clock-to-clock delay, d, are transferred to the multiple-RX unit, 240. The multiple-RX unit, 240, is provided with receivers respectively corresponding to the RX antennas, Ant_Rx. The receivers are driven by the RX clock signals (i.e., RxCLK_1, RxCLK_2, . . . , and RxCLK_N) and receive the RX pulses. The RX pulses are received through the respective RX antennas, Ant_Rx and the received RX signals may be transferred to the pulse radar driving unit, 210, that includes a signal processor.

In the multiple-RX unit, 240, the directivity, $\varphi_{Rx}$, of the multiple-RX unit, 240, may be defined by the RX clock-to-clock delay, d, with RX operations according to the respective RX clock signals (i.e., RxCLK_1, RxCLK_2, . . . , and RxCLK_N). In other words, the directivity of the multiple-RX unit, 240, may be controlled by the magnitude of the RX clock-to-clock delay, d.

Although not illustrated, it have been described in relation to FIG. 2 that the detection range (or range) is determined by a time interval at the time of receiving the RX pulse after emitting the TX pulse. In the present inventive concept, the pulse radar driving unit 210 may control the magnitude of a TX-to-RX delay between the TX clock signals and the RX clock signals to select the detection range.

In addition, although the TX pulse is illustrated with one waveform, this means that the TX pulses respectively emitted from the plurality of TX antennas may be represented by one pulse having a directivity. Such a directivity depends on the magnitude of the aforementioned TX clock-to-clock delay, δ. According to the present inventive concept, an RX operation of a pulse radar having a directivity in a space is enabled according to the RX clock-to-clock delay, d.

Figure 4:
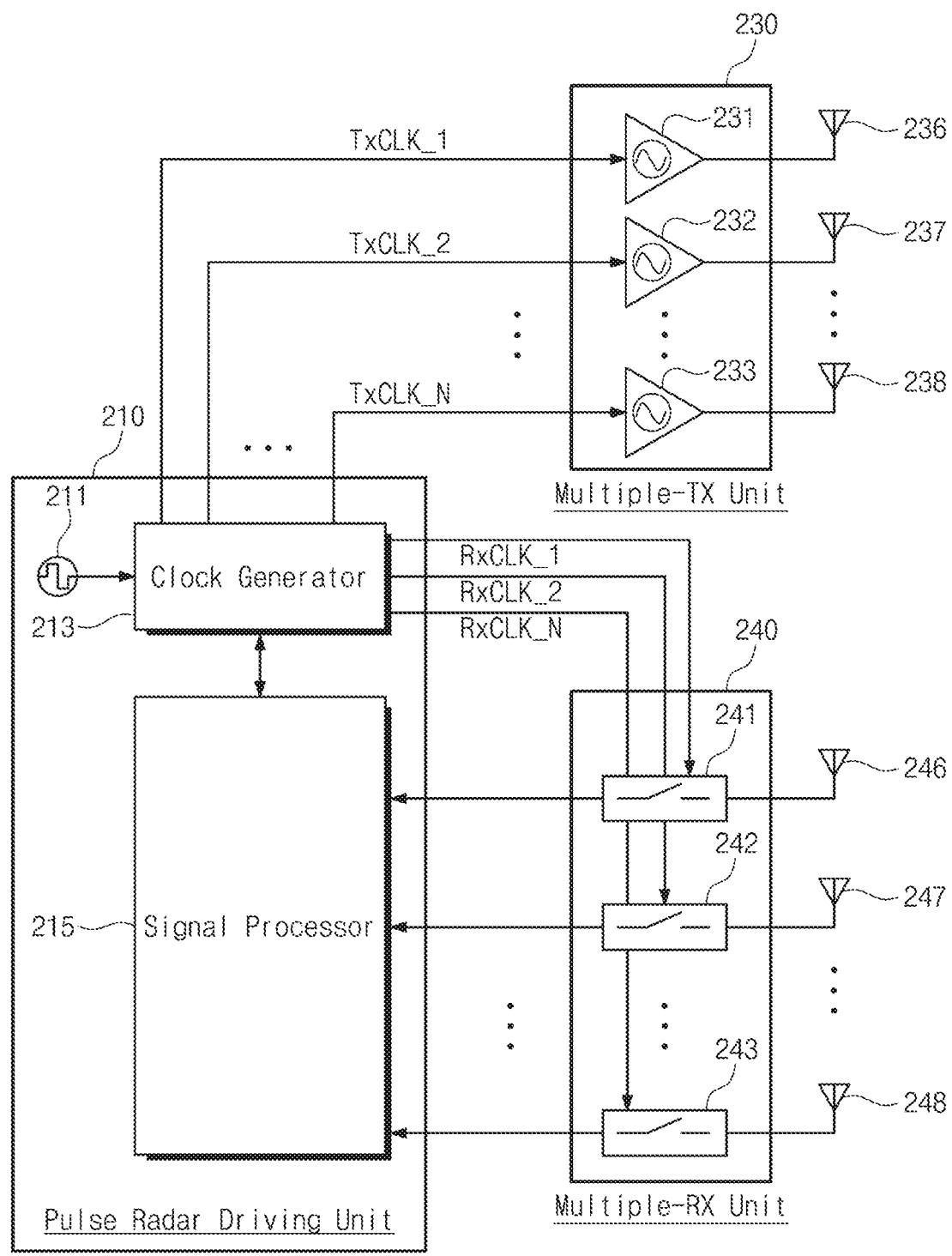
FIG. 4 is a block diagram illustrating in detail the pulse radar device of FIG. 3 according to an embodiment of the present inventive concept.

FIG. 4 is a block diagram illustrating in detail the pulse radar device of FIG. 3 according to an embodiment of the present inventive concept. Referring to FIG. 4, the pulse radar device, 200, may include a pulse radar driving unit, 210, a multiple-TX unit, 230, and a multiple-RX unit, 240.

The pulse radar driving unit, 210, includes a clock generator, 213, and a signal processor, 215. The clock generator, 213, generates multiple TX clock signals (i.e., TxCLK_1, TxCLK_2, . . . , and TxCLK_N) and multiple RX clock signals (i.e., RxCLK_1, RxCLK_2, . . . , and RxCLK_N) using a reference clock signal, 211. The clock generator, 213, may include, for example, a delay locked loop (DLL) or a phase locked loop (PLL). The clock generator, 213, may generate the TX clock signal, TxCLK, from the reference clock, 211, using the DLL or PLL.

The clock generator, 213, may generate the multiple TX clock signals (i.e., TxCLK_1, TxCLK_2, . . . , and TxCLK_N) having an interval of a TX clock-to-clock delay, $\delta$. For example, the clock generator, 213, may generate the multiple TX clock signals (i.e., TxCLK_1, TxCLK_2, . . . , and TxCLK_N) having the TX clock-to-clock delay, $\delta$, using a voltage controlled delay line (VCDL). The clock generator, 213, generates multiple RX clock signals (i.e., RxCLK_1, RxCLK_2, . . . , and RxCLK_N) in the same manner as the multiple TX clock signals (i.e., TxCLK_1, TxCLK_2, . . . , and TxCLK_N).

The signal processor, 215, may control the clock generator, 213, to generate the multiple TX clock signals (i.e., TxCLK_1, TxCLK_2, . . . , and TxCLK_N) according to the preset TX clock-to-clock delay, $\delta$. The signal processor, 215, may control the clock generator, 213, to generate the multiple RX clock signals (i.e., RxCLK_1, RxCLK_2, . . . , and RxCLK_N) according to the preset RX clock-to-clock delay, d.

The signal processor, 215, may receive, from the multiple-RX unit 240, echo signals having been received using the multiple RX clock signals (i.e., RxCLK_1, RxCLK_2, . . . , and RxCLK_N). The signal processor, 215, may analyze target information using the received signals. For example, the signal processor, 215, may analyze the received signals to obtain position information such as an orientation of or a distance to the target. At the same time, the signal processor, 215, may also combine the RX signals to detect a type or movement of the target.

The multiple-TX unit, 230, may include a plurality of transmitters (i.e., 231, 232, and 233) and a plurality of TX antennas (i.e., 236, 237, and 238). Each of the plurality of transmitters (i.e., 231, 232, and 233) generate pulse signals using the multiple TX clock signals (i.e., TxCLK_1, TxCLK_2, . . . , and TxCLK_N) to provide the pulse signals for the TX antennas (i.e., 236, 237 and 238). The TX antennas (i.e., 236, 237 and 238) emit the TX pulse signals respectively corresponding to the multiple TX clock signals (i.e., TxCLK_1, TxCLK_2, . . . , and TxCLK_N) to a space or a specific medium. The orientation angle, $\varphi_{Tx}$, of the TX pulse, which is formed by the signals from the TX antennas (i.e., 236, 237 and 238), may be controlled by a TX clock-to-clock delay, $\delta$, that represents the magnitude of a delay between the multiple TX clock signals (i.e., TxCLK_1, TxCLK_2, . . . , and TxCLK_N).

The above-described TX clock signals (i.e., TxCLK_1, TxCLK_2, . . . , and TxCLK_N) are provided for the multiple-TX unit, 230, in a TX pulse repetition period (i.e., inverse of a pulse repetition frequency) so that the pulses are repeatedly transmitted. In addition, to receive the echo signal, the clock generator, 213, provides the multiple-RX unit, 240, with the multiple RX clock signals (i.e., RxCLK_1, RxCLK_2, . . . , and RxCLK_N), after a TX-to-RX time delay every time the TX pulses are emitted. The above operation for the radar (i.e., radar operation) is repeated.

Here, according to technical features of the present inventive concept, a TX antenna is not the only means for emitting a TX pulse into a space. For example, it would be well understood to those skilled in the art that the TX antenna may be replaced by various means for emitting the TX pulses into a space filled with various media. For example, it would be well understood that, for emitting the TX pulse into a fluid filled medium such as water, a different means functioning as a TX antenna is required. In some applications of the present inventive concept, a medium for the TX pulses can be a cable or an iron rod. For such cases, the features of the present inventive concept may be applied by observing a reflection pulse from the discontinuous interface of the medium lying.

The multiple-RX unit, 240, may control the directivity using the multiple RX clock signals (i.e., RxCLK_1, RxCLK_2, . . . , and RxCLK_N). The multiple-RX unit, 240, may include a plurality of pulse receivers (i.e., 241, 242 and 243), and a plurality of RX antennas (i.e., 246, 247 and 248). By using the multiple RX clock signals (i.e., RxCLK_1, RxCLK_2, . . . , and RxCLK_N), the pulse receivers (i.e., 241, 242 and 243) receive RX signals through the plurality of RX antennas (i.e., 246, 247 and 248), respectively. The received signals of the pulse receivers (i.e., 241, 242 and 243) may be transferred to the signal processor, 215.

The multiple-RX unit, 240, of the present inventive concept receives RX pulses by means of the multiple RX clock signals (i.e., RxCLK_1, RxCLK_2, . . . , and RxCLK_N) having the time difference of the RX clock-to-clock delay, d. Thus, the directivity of the multiple-RX unit, 240, may be adjusted by changing the magnitude of the RX clock-to-clock delay, d.

Figure 5A:
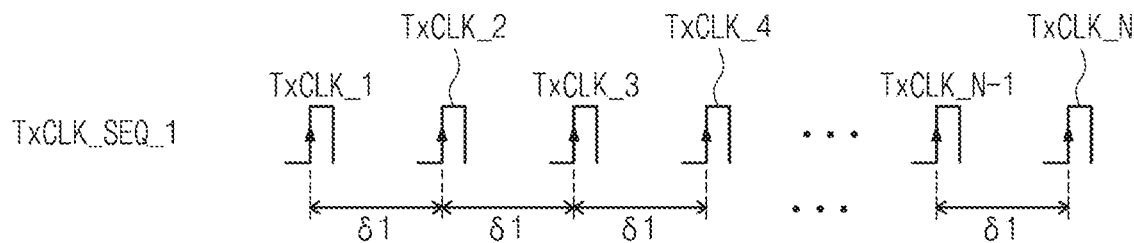
FIGS. 5A and 5B are waveform diagrams exemplarily showing delay relations between multiple TX clock signals according to the present inventive concept.
Figure 5A:
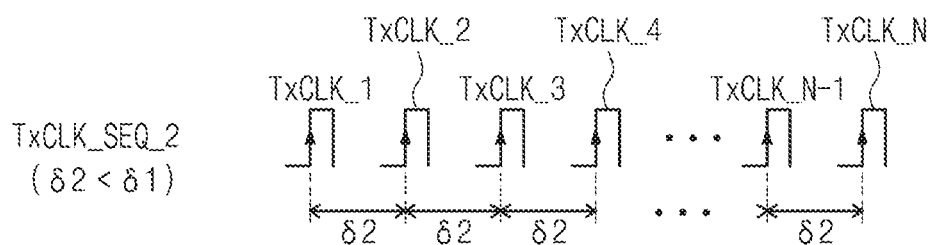
Figure 5A:
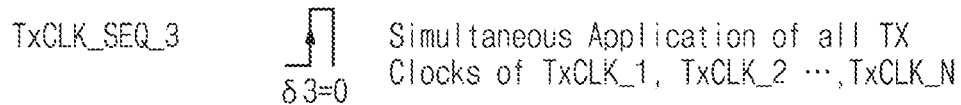
Figure 5A:
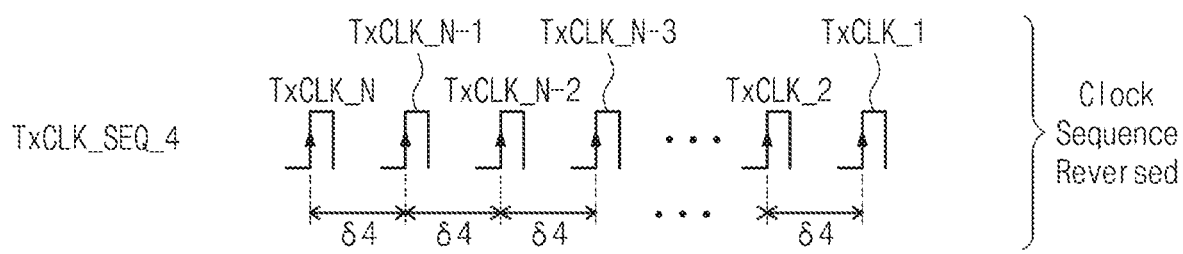
Figure 5A:
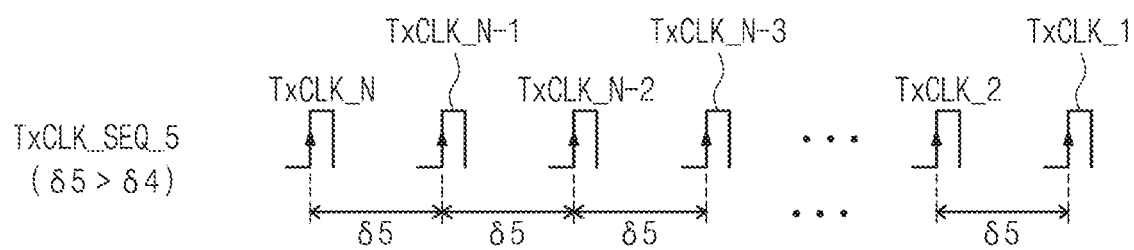
Figure 5B:
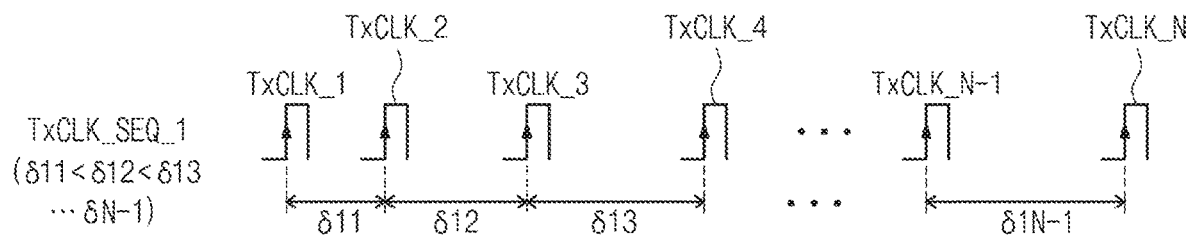
Figure 5B:
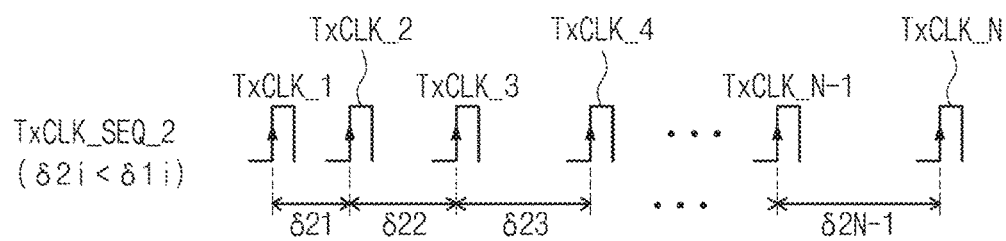
Figure 5B:
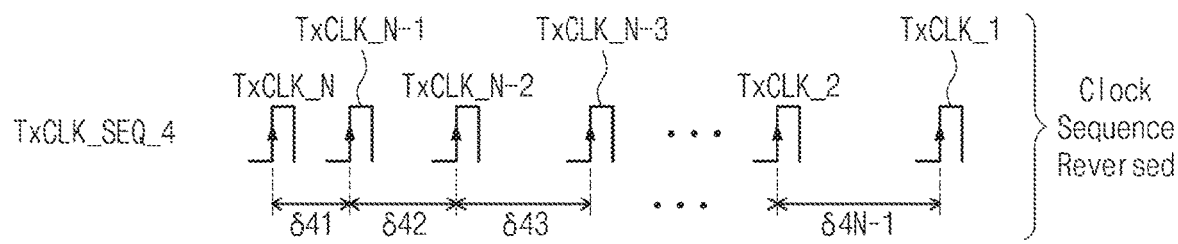
Figure 5B:
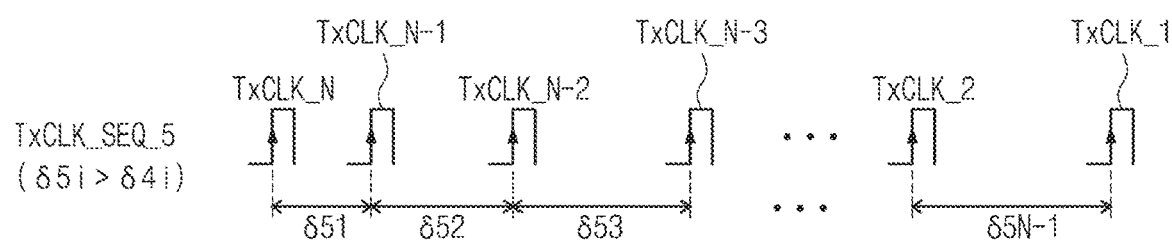

FIGS. 5A and 5B are waveforms exemplarily showing a delay relationship between multiple TX clock signals according to the present inventive concept. In FIG. 5A, each of the multiple TX clock signals, TxCLK_i, may be defined to have an identical TX clock-to-clock delay, $\delta$, with an adjacent clock.

Referring to FIG. 5A, the multiple TX clock signals, TxCLK_i, may be classified into a plurality of sequences according to the magnitude of the TX clock-to-clock delay, $\delta$, that determines a directivity of the TX pulse. Such a classification may be applied identically to the multiple RX clock signals, RxCLK_k, according to the magnitude of the RX clock-to-clock delay, d, that controls the directivity of the multiple receivers, 240. However, in order to avoid repetitive explanations, only sequences of the multiple TX clock signals, TxCLK_i, are exemplarily illustrated. For convenience of explanation, the multiple TX clock signals, TxCLK_i, are exemplarily illustrated as five sequences (i.e., TxCLK_SEQ_1, TxCLK_SEQ_2, TxCLK_SEQ_3, TxCLK_SEQ_4, and TxCLK_SEQ_5). However, it would be well understood that various TX clock sequences may be set according to the magnitude of the TX clock-to-clock delay, $\delta$.

The first TX clock sequence, TxCLK_SEQ_1, has a TX clock-to-clock delay, $\delta 1$, between the TX clock signals (i.e., TxCLK_1, TxCLK_2, . . . , and TxCLK_N). In other words, there is a time difference of the TX clock-to-clock delay, $\delta 1$, between the first TX clock signal, TxCLK_1, applied to the first transmitter, 231, (see FIG. 4) and the second TX clock signal, TxCLK_2, applied to the second transmitter, 232. In this way, the equally delayed (i.e., the TX clock-to-clock delay, $\delta 1$) TX clock signals (i.e., TxCLK_1, TxCLK_2, . . . , and TxCLK_N) may be sequentially applied to the corresponding transmitters.

The second TX clock sequence, TxCLK_SEQ_2, has a TX clock-to-clock delay, δ2, between the TX clock signals (i.e., TxCLK_1, TxCLK_2, . . . , and TxCLK_N). Here, (δ1, δ2) may have a magnitude relation of (δ1>δ2).

The third TX clock sequence, TxCLK_SEQ_3, has a TX clock-to-clock delay, δ3=0, between the TX clock signals (i.e., TxCLK_1, TxCLK_2, . . . , and TxCLK_N). In other words, the TX clock signals (i.e., TxCLK_1, TxCLK_2, . . . , and TxCLK_N) are applied at the same time to the respective transmitters for generating the TX pulses.

The fourth TX clock sequence, TxCLK_SEQ_4, has a TX clock-to-clock delay, δ4, between the TX clock signals (i.e., TxCLK_1, TxCLK_2, . . . , and TxCLK_N). At this point, an order of the TX clock signals (i.e., TxCLK_1, TxCLK_2, . . . , and TxCLK_N) is reversed. In other words, the TX clock signals (i.e., TxCLK_1, TxCLK_2, . . . , and TxCLK_N) are arranged in the reversed order in comparison to the first and second TX clock sequences, TxCLK_1 and TxCLK_2.

The fifth TX clock sequence, TxCLK_SEQ_5, has a TX clock-to-clock delay, δ5, between the TX clock signals (i.e., TxCLK_1, TxCLK_2, . . . , and TxCLK_N). At this point, the order of the TX clock signals (i.e., TxCLK_1, TxCLK_2, . . . , and TxCLK_N) is reversed in comparison to the first and second TX clock sequences, TxCLK_1 and TxCLK_2. Here, an absolute value of the TX clock-to-clock delay, δ5, may be identical to that of the TX clock-to-clock delay, δ1, in the first TX clock sequence, TxCLK_SEQ_1.

Hereinbefore, an example has been described in which the magnitude of an adjacent clock-to-clock delay, δ, between the TX clock signals (i.e., TxCLK_1, TxCLK_2, . . . , and TxCLK_N) is changed. Here, the examples for the identical magnitude of the delay between the TX clock signals has been only described.

Referring to FIG. 5B, the multiple TX clock signals, TxCLK_i, may be classified into each of a plurality of sequences according to the magnitude of the TX clock-to-clock delay, δ, that provides the directivity of the TX pulses. The magnitude of the TX clock-to-clock delay, δ, may increase linearly, or may increase or decrease in a higher-order function or exponential function type within each sequence.

For example, the first TX clock sequence, TxCLK_SEQ_i, has different magnitudes of TX clock-to-clock delays (i.e., δ11, δ12, δ13, δ14, . . . , δ1N-1) between the TX clock signals (i.e., TxCLK_1, TxCLK_2, . . . , and TxCLK_N). In other words, there is a time difference of the TX clock-to-clock delay, δ11, between the first TX clock signal, TxCLK_1, applied to the first transmitter, 231, (see FIG. 4) and the second TX clock signal, TxCLK_2, applied to the second transmitter, 232. In addition, there is a time difference of the TX clock-to-clock delay, δ12, between the second TX clock signal, TxCLK_2, applied to the second transmitter, 232, and the third TX clock signal, TxCLK_3, applied to the third transmitter, 233.

In this way, it would be well understood that for the same clock sequence, the TX clock-to-clock delays (i.e., δ11, δ12, δ13, δ14, . . . , and δ1N-1) may increase linearly, or may increase or decrease in a higher-order function or exponential function type. Such a setting of the magnitudes of the TX clock-to-clock delays (i.e., δ11, δ12, δ13, δ14, . . . , and δ1N-1) may be variously changed according to the methods of controlling the directivity of the TX pulses.

Although the method for setting the magnitude of the TX clock-to-clock delays, δ, has been described hereinbefore, such setting methods may also be identically applied to the RX clock-to-clock delay, d.

Figure 6:
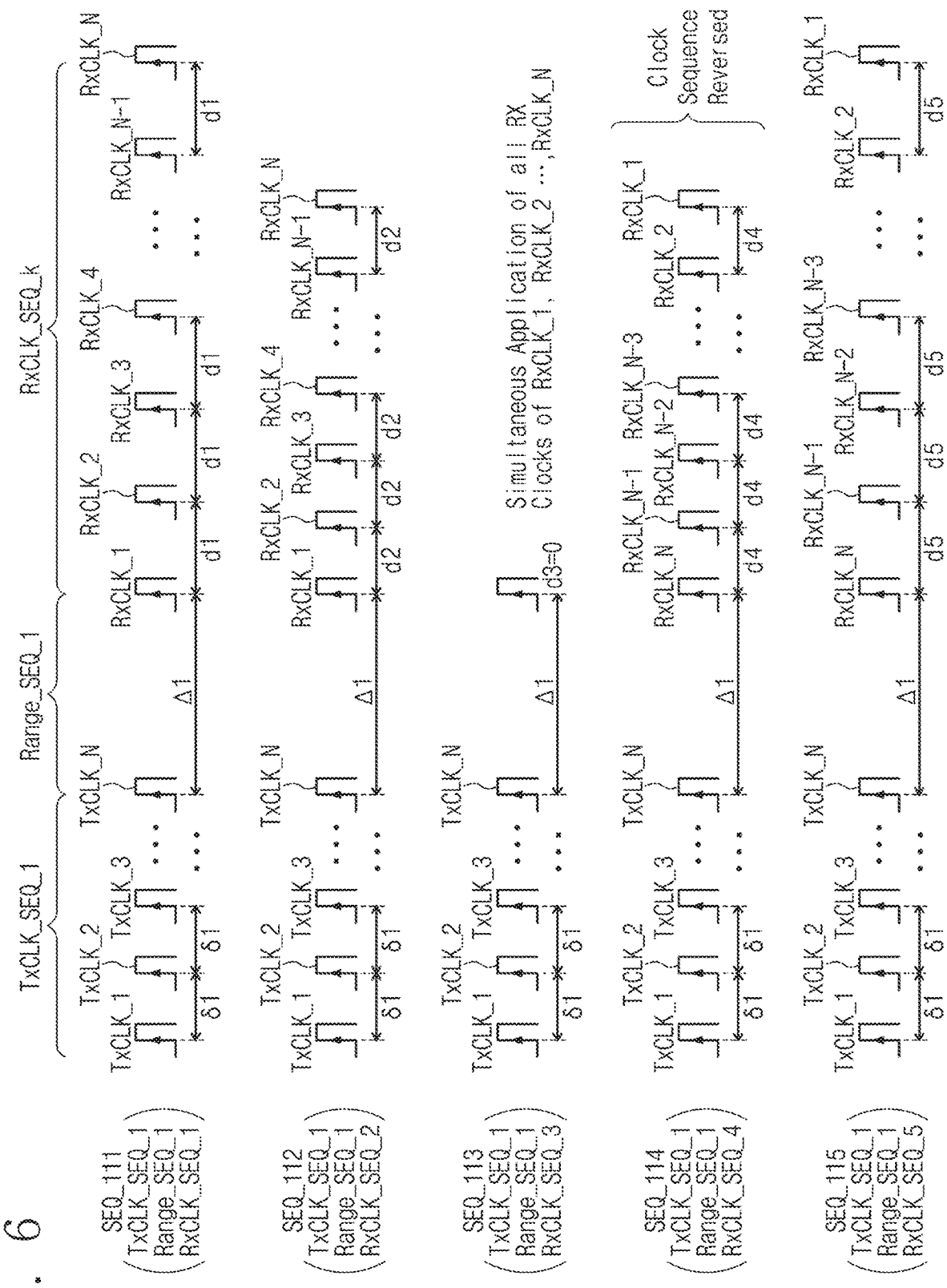
FIG. 6 is a waveform diagram exemplarily showing a control method of a TX clock and an RX clock for selecting a directivity of a TX pulse, a receiver directivity, and a detection range.

FIG. 6 is a waveform diagram that exemplarily shows control methods of the TX and RX clock signals for controlling the TX pulse directivity, the directivity of the multiple-RX unit, and the detection range. Referring to FIG. 6, the multiple TX clock signals (i.e., TxCLK_1, TxCLK_2, . . . , and TxCLK_N), the TX-to-RX delay, and the multiple RX clock signals (i.e., RxCLK_1, RxCLK_2, . . . , and RxCLK_N) are classified into a plurality of sequences. The TX-to-RX delay—representing a delay value of the multiple TX clock signals (i.e., TxCLK_1, TxCLK_2, . . . , and TxCLK_N) and the multiple RX clock signals (i.e., TxCLK_1, TxCLK_2, . . . , and TxCLK_N)—is a delay value between most adjacent clock signals as illustrated in FIG. 6. However, it is possible to define, as the TX-to-RX delay, a specific clock (e.g. the first TX clock signal, TxCLK_1) among the multiple TX clock signals (i.e., TxCLK_1, TxCLK_2, . . . , and TxCLK_N) and a specific clock (e.g., the first RX clock signal, RxCLK_1) among the multiple RX clock signals (i.e., RxCLK_1, RxCLK_2, . . . , and RxCLK_N).

Sequence SEQ_111 represents a combination of a first TX clock sequence, TxCLK_SEQ_1, a first range sequence, Range_SEQ_1 and a first RX clock sequence, RxCLK_SEQ_1. In other words, in sequence SEQ_111, the multiple TX clock signals (i.e., TxCLK_1, TxCLK_2, . . . , and TxCLK_N) have a time interval of the TX clock-to-clock delay, δ1. Also, sequence SEQ_111 has a TX-to-RX delay, Δ1—the delay between the multiple TX clock signals (i.e., TxCLK_1, TxCLK_2, . . . , and TxCLK_N) and the multiple RX clock signals (i.e., RxCLK_1, RxCLK_2, . . . , and RxCLK_N). In addition, in sequence SEQ_111, the multiple RX clock signals (i.e., RxCLK_1, RxCLK_2, . . . , and RxCLK_N) are set to have a time interval of the RX clock-to-clock delay, d1.

Sequence SEQ_112 represents a clock sequence in which the directivity of the multiple-RX unit, 240, is adjusted in comparison to sequence SEQ_111. In other words, sequence SEQ_112 is identical to sequence SEQ_111 for the first TX clock sequence, TxCLK_SEQ_1, and a first range sequence, Range_SEQ_1. However, it is observed that the RX clock-to-clock delay between the multiple RX clock signals (i.e., RxCLK_1, RxCLK_2, . . . , and RxCLK_N) is set to 'd2'. Accordingly, in sequence SEQ_112 as illustrated, the RX clock-to-clock delay between the multiple RX clock signals (i.e., RxCLK_1, RxCLK_2, . . . , and RxCLK_N) is reduced in comparison to sequence SEQ_111. Such a condition means that, for sequence SEQ_112, only the directivity of the multiple-RX unit, 240, is changed in comparison to sequence SEQ_111.

Sequence SEQ_113 represents a clock sequence in which the directivity of the multiple-RX unit, 240, is adjusted in comparison to the sequence SEQ_112. In other words, sequence SEQ_113 is identical to the first TX clock sequence, TxCLK_SEQ_1, and a first range sequence, Range_SEQ_1, is identical to the sequence SEQ_112. However, it indicates that each of the multiple RX clock signals (i.e., RxCLK_1, RxCLK_2, . . . , and RxCLK_N) is set to have zero delay (d3=0). In other words, under the condition of sequence SEQ_113, the multiple RX clock signals (i.e., RxCLK_1, RxCLK_2, . . . , and RxCLK_N) are applied at the same time.

In the above-described manner, sequences SEQ_114 and SEQ_115 adjust the directivity of the multiple-RX unit, 240, while the directivity of the TX pulse and the detection range are maintained. When the clock sequence is adjusted with the illustrated sequences (i.e., SEQ_111, SEQ_112, SEQ_113, SEQ_114, and SEQ_115), the TX clock-to-clock delay between the multiple TX clock signals (i.e., TxCLK_1, TxCLK_2, . . . , and TxCLK_N) is identically maintained as 'δ1'. Accordingly, the TX pulse may be emitted with a fixed spatial directivity. After the TX clock is provided to the multiple-RX unit, 230 (see FIG. 4), a time delay when an RX clock is provided to the multiple-RX unit, 240, is also constant. Accordingly, the pulse radar device, 200, scans a specific detection range for the same distance. However, as the delay between the multiple RX clock signals (i.e., RxCLK_1, RxCLK_2, . . . , and RxCLK_N) changes sequentially, it is obvious that the directivity of the multiple-RX unit, 240, is changed.

The illustrated sequential change of the clock sequence is just an example for assisting understanding of the present inventive concept. In order to change the directivity of the TX pulse, it is sufficient to change a TX clock sequence, TxCLK_SEQ, of the multiple TX clock signals (i.e., TxCLK_1, TxCLK_2, . . . , and TxCLK_N). Also, in order to change the detection range of the pulse radar device, 200, it is sufficient to change the range sequence, Range_SEQ. In the end, the pulse radar device, 200, of the present inventive concept may scan the entire detection range in all directions through setting of the clock sequence, SEQ.

Figure 7A:
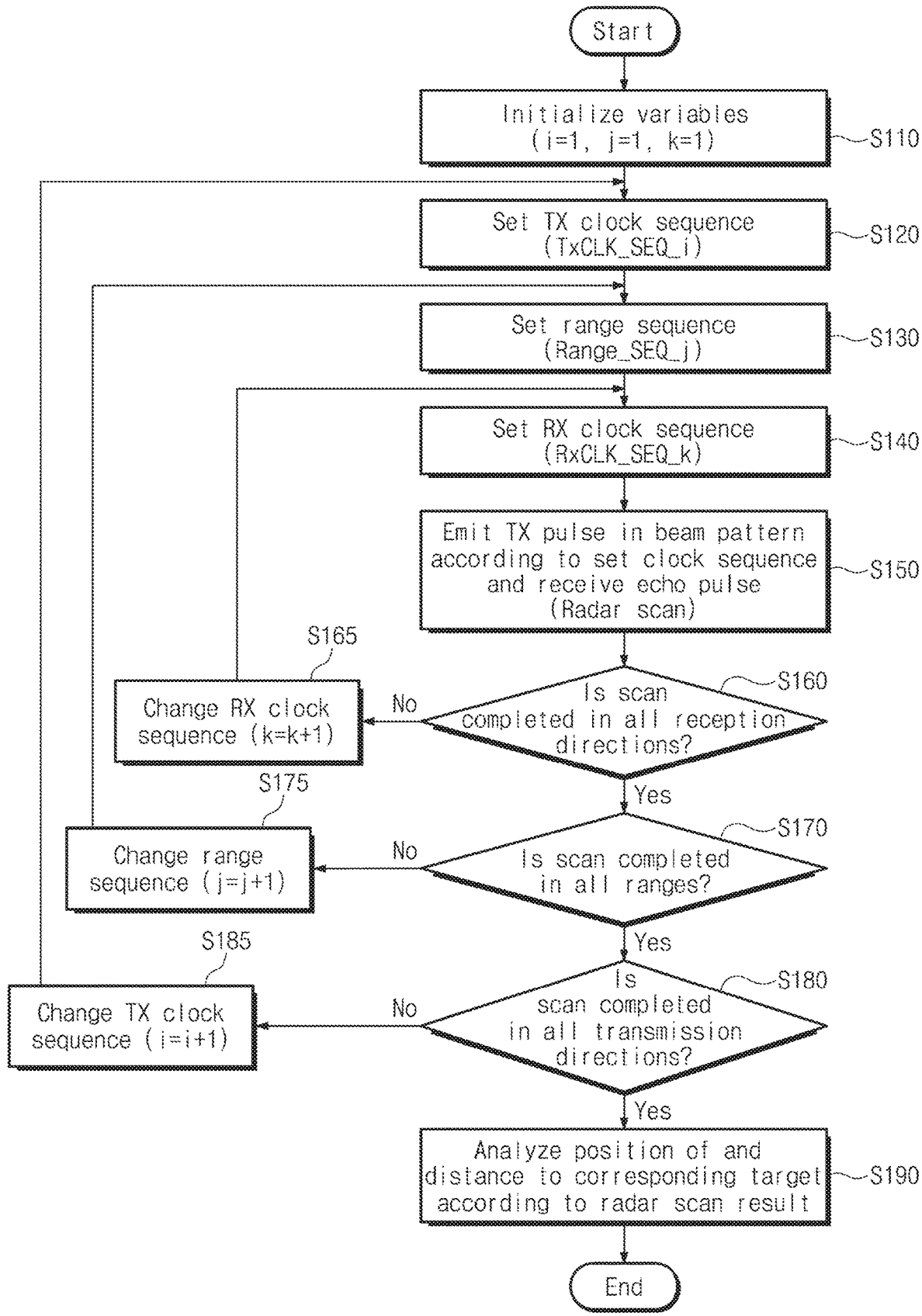
FIG. 7A is a flowchart exemplarily showing a method for adjusting a directivity of a pulse radar device of the present inventive concept.

FIG. 7A is a flowchart exemplarily showing a method for adjusting a directivity of a pulse radar device of the present inventive concept. In relation to FIG. 7A, an exemplary explanation will be presented on the method for controlling a directivity and range of a TX-to-RX pulse in the pulse radar device, 200, including the multiple-TX unit, 230, and the multiple-RX unit, 240.

In operation S110, the signal processor, 215, of the pulse radar device, 200, initializes variables i, j, and k to i=j=k=1. Here, variable i is for selecting the TX clock sequence, TxCLK_SEQ. Variable j is for selecting the range sequence, Range_SEQ. The variable k is for indicating the RX clock sequence, RxCLK_SEQ.

In operation S120, the signal processor, 215, may set the clock generator, 213, to generate the multiple TX clock signals (i.e., TxCLK_1, TxCLK_2, . . . , and TxCLK_N) corresponding to a TX clock sequence, TxCLK_SEQ_i. Right after the initialization, the TX clock sequence, TxCLK_SEQ_i, where i=1, is set. For that, the signal processor, 215, may control the clock generator, 213, to generate the multiple TX clock signals (i.e., TxCLK_1, TxCLK_2, . . . , and TxCLK_N) with the TX clock-to-clock delay, δ, corresponding to the TX clock sequence, TxCLK_SEQ_1.

In operation S130, the signal processor, 215, sets the range sequence, Range_SEQ for defining the TX-to-RX delay, Δ. In other words, right after the initialization, the range sequence, Range_SEQ_j, where j=1, is set. For that, the signal processor 215 may set the clock generator 213 with the TX-to-RX delay, Δ, corresponding to the range sequence, Range_SEQ_1.

In operation S140, the signal processor, 215, may set the clock generator, 213, to generate the multiple RX clock signals (i.e., RxCLK_1, RxCLK_2, . . . , and RxCLK_N) corresponding to the RX clock sequence, RxCLK_SEQ. Right after the initialization, the RxCLK_SEQ_k, where k=1, is set. For that, the signal processor, 215, may control the clock generator, 213, to generate the multiple RX clock signals (i.e., RxCLK_1, RxCLK_2, . . . , and RxCLK_N) with the RX clock-to-clock delay, d, corresponding to the RX clock sequence, RxCLK_SEQ_1.

In operation S150, the signal processor, 215, may control the multiple-TX unit, 230, and the multiple-RX unit, 240, to scan an area corresponding to the predefined directivity and range. In other words, the multiple-TX unit, 230, may generate and emit the TX pulses according to the TX clock sequence, TxCLK_SEQ_i, defined in operation S120. In addition, the signal processor, 215, may control the multiple-RX unit, 240, to receive echo pulses after the TX-to-RX delay, Δ, which corresponds to the range sequence, Range_SEQ_j, defined in operation S130. The multiple-RX unit, 240, may receive the echo pulses using multiple RX antennas according to the RX clock sequence, RxCLK_SEQ_k defined in operation S140. At this point, it would be well understood that TXs and RXs may be repeated the preset number of times under the same conditions as the TX clock sequence, TxCLK_SEQ_i, the range sequence, Range_SEQ_j, and the RX clock sequence, RxCLK_SEQ_k. An SNR of the received signal may be enhanced through repetitive radar scans for the identical distance and position.

In operation S160, the signal processor, 215, checks whether RXs from all RX directions are completed. For example, the signal processor, 215, determines whether operations using all the set RX clock sequences, RxCLK_SEQ_k, are completed. When it is determined that receptions of the RX pulses corresponding to all the RX clock sequences, RxCLK_SEQ_k, are completed (to Yes direction), the procedure proceeds to operation S170. On the contrary, when the set RX clock sequences, RxCLK_SEQ_k, are not fully used (to No direction), the procedure proceeds to operation S165.

In operation S165, the signal processor, 215, changes the RX clock sequence, RxCLK_SEQ_k, for adjusting the directivity of the multiple-RX unit, 240. In other words, the signal processor, 215, may increase variable, k, of the RX clock sequence, RxCLK_SEQ_k, to (k+1). Then, the procedure returns to operation S140. In addition, the signal processor, 215, may set the clock generator, 213, to have the RX clock-to-clock delay, d, corresponding to the changed RX clock sequence, RxCLK_SEQ_(k+1). In addition, the pulse radar device, 200, may emit the TX pulse and receive the RX pulse according to the TX clock sequence, TxCLK_SEQ_i, and the range sequence, Range_SEQ_j, set in operations S120 and S130. Such an operation loop S140→S150→S160→S165 may be repeated until the pulse RXs from all the predefined RX directions are completed.

In operation S170, the signal processor 215 checks whether scans for all the ranges are completed. For example, the signal processor 215 determines whether scans using all the set range sequences, Range_SEQ_j, are completed. When it is determined that the scans corresponding to all the range sequences, Range_SEQ, are completed (to Yes direction), the procedure proceeds to operation S180. On the contrary, when all the set range sequences, Range_SEQ_j, are not detected (to No direction), the procedure proceeds to operation S175.

In operation S175, the signal processor, 215, changes the range sequence, Range_SEQ, for selecting a distance for the detection range. In other words, the signal processor, 215, may increase variable j of the range sequence, Range_SEQ_j, to (j+1). Then, returning to operation S130, the signal processor 215 may set the clock generator 213 to have the TX-to-RX delay, Δ, corresponding to the changed range sequence, Range_SEQ. In addition, the signal processor, 215, performs an operation loop S140→S150→S160→S165 for a radar scanning operation while changing the RX clock sequence under the condition of the TX clock sequence, TxCLK_SEQ_1, given in operation S120.

In operation S180, the signal processor, 215, checks whether scans in all TX directions are completed. The signal processor, 215, determines whether scans using all the set TX clock sequences, TxCLK_SEQ_i, are completed. When it is determined that the scans corresponding to all the TX clock sequences, TxCLK_SEQ_i, are completed (to Yes direction), the procedure proceeds to operation S190. On the contrary, when the set TX clock sequences, TxCLK_SEQ_i, are not fully used (to No direction), the procedure proceeds to operation S185.

In operation S185, the signal processor, 215, changes the TX clock sequence, TxCLK_SEQ_i, for changing the directivity of the TX pulse. In other words, the signal processor, 215, may increase variable i of the TX clock sequence, TxCLK_SEQ_i, to (i+1). Then, the procedure returns to operation S120. In addition, the signal processor, 215, may set the clock generator, 213, to have the TX clock-to-clock delay, δ, corresponding to the changed TX clock sequence, TxCLK_SEQ_(i+1). Then the signal processor 215 may process an RX clock sequence adjusting loop S140→S150→S160→S165 and a range sequence adjusting loop S130→S140→S150→S160→S170→S175 according to the changed TX clock sequence, TxCLK_SEQ_(i+1).

In operation S190, the signal processor 215 may obtain information on a position of or a distance to a target, a type of the target, or a movement of the target by analyzing the scan results from all directions and ranges. In other words, the signal processor, 215, may analyze features of the target using the scan results for all the set TX clock sequences, TxCLK_SEQ_i, range sequences, Range_SEQ_j, and RX clock sequences, RxCLK_SEQ_k.

In the above-described embodiment, the description has been provided about an exemplary manner in which the signal processor, 215, uses the scan results for all the set TX clock sequences, TxCLK_SEQ_i, range sequences, Range_SEQ_j, and RX clock sequences, RxCLK_SEQ_k. In other words, a full-area scan method has been exemplarily described in which a combination of all changeable sequence variables i, j and k is sequentially changed. However, from the effect of the present inventive concept, it would be obvious that an active scan control is possible in which after detection of a partial area and on the basis of the detection result, scans for a next sequence combination is decided. For that, the signal processor, 215, may change the execution sequence of the operation S190. For example, operation S190 is made intervened between operation S170 and operation S180, a detection is performed by fixing variable k (namely, fixing the RX clock sequence, 'RxCLK_SEQ_k'), and changing variables i and j, and then variable k may be changed by analyzing the detection result therefrom.

Hereinbefore, the description has been briefly provided about the operation methods of the pulse radar device, 200, that uses the multiple TX antennas and the multiple RX antennas illustrated in FIGS. 3 and 4. In particular, it has been described that in the changing order of the clock sequence, the range sequence, Range_SEQ_j, is changed after the change of the RX clock sequence, RxCLK_SEQ_k, is completed, and the TX clock sequence, TxCLK_SEQ_j, is changed after the change of the range sequence, Range_SEQ_j, is completed. However, the embodiment of the inventive concept is not limited thereto and the clock sequence changing order may be operated in various schemes according to applications.

For example, after the change of the range sequence, Range_SEQ_j, is completed, the RX clock sequence, RxCLK_SEQ_k, may be changed. After the change of the RX clock sequence, RxCLK_SEQ_k, is completed, the TX clock sequence, TxCLK_SEQ_i, may be changed. In this case, the pulse radar device, 200, may operate in a manner that reception is performed by changing the detection range, while the TX directivity and the RX directivity are fixed. In addition, the reception operation is done by changing the detection range at a specific RX directivity. When radar scans for all RX directivities, the pulse radar device, 200, may operate to change the TX directivity.

Briefly, the pulse radar device, 200, of the present inventive concept may change the TX clock sequence, TxCLK_SEQ_i, the range sequence, Range_SEQ_j, and the RX clock sequence, RxCLK_SEQ_k. In addition, since the order of each of the sequences may also be changed, the pulse radar device, 200, of the present inventive concept may apply the high directivity characteristics in various ways.

Figure 7B:
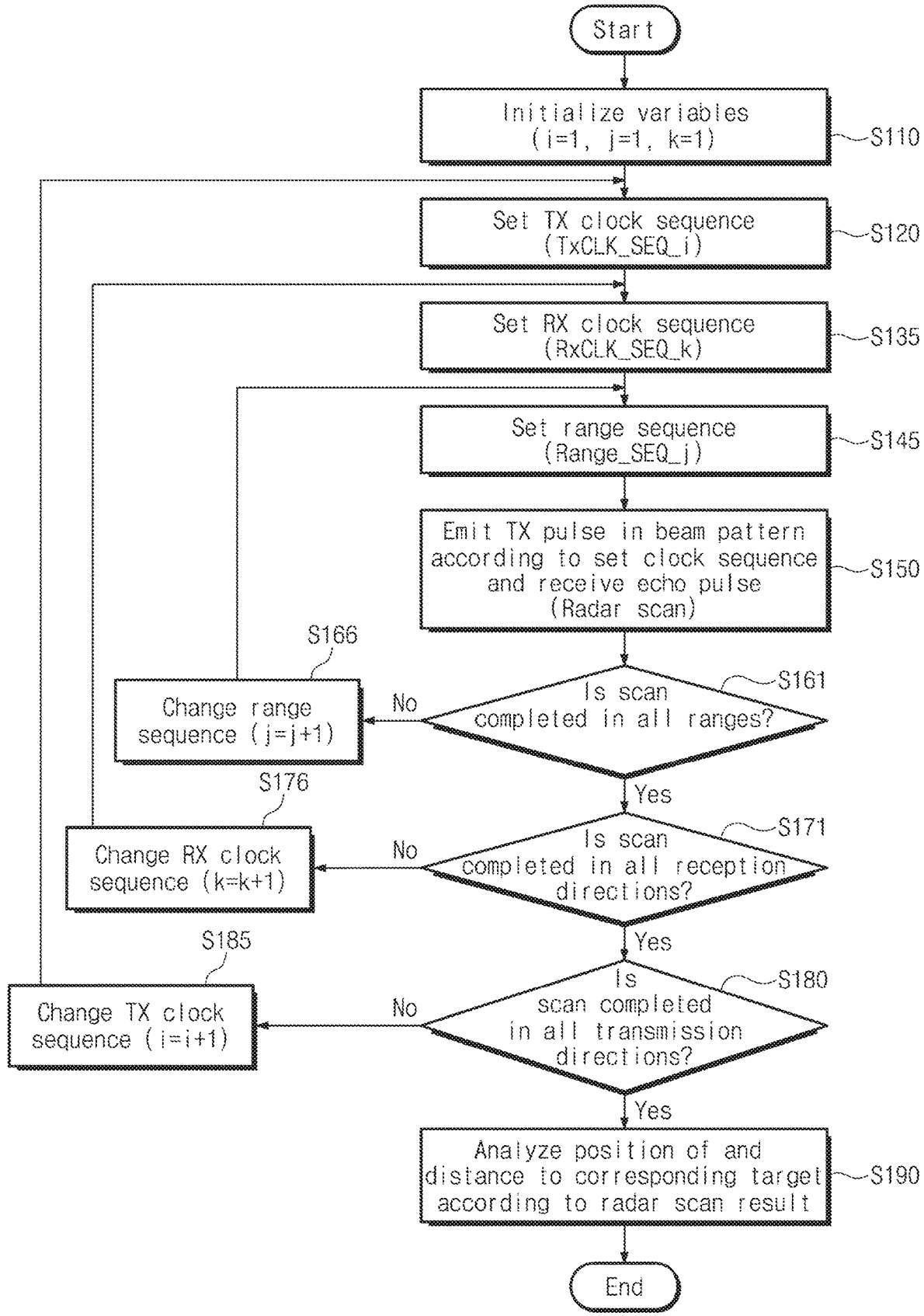
FIG. 7B is a flowchart exemplarily showing a method for adjusting a directivity of a pulse radar device of the present inventive concept.

FIG. 7B is a flowchart exemplarily showing another example of a method for adjusting a directivity of a pulse radar device of the present inventive concept. In relation to FIG. 7B, an exemplary explanation will be presented on the method for controlling a directivity and range of a TX-to-RX pulse in the pulse radar device, 200, in which the directivity adjusting procedure in FIG. 7A is partially changed.

In operation S110, the signal processor, 215, of the pulse radar device, 200, initializes variables i, j and k to i=j=k=1. Here, variable i is for selecting the TX clock sequence, TxCLK_SEQ. Variable j is for selecting the range sequence, Range_SEQ. In addition, variable k is for indicating the RX clock sequence, RxCLK_SEQ.

In operation S120, the signal processor, 215, may set the clock generator, 213, to generate the multiple TX clock signals (i.e., TxCLK_1, TxCLK_2, . . . , and TxCLK_N) corresponding to the TX clock sequence, TxCLK_SEQ_i. Right after the initialization, the TX clock sequence, TxCLK_SEQ_i, where i=1, is set. For that, the signal processor, 215, may control the clock generator, 213, to generate the multiple TX clock signals (i.e., TxCLK_1, TxCLK_2, . . . , and TxCLK_N) with the TX clock-to-clock delay, δ, corresponding to the TX clock sequence, TxCLK_SEQ_i, where i=1.

In operation S135, the signal processor, 215, may set the clock generator, 213, to generate the multiple RX clock signals (i.e., RxCLK_1, RxCLK_2, . . . , and RxCLK_N) corresponding to the RX clock sequence, RxCLK_SEQ. Right after the initialization, the RX clock sequence RxCLK_SEQ_k, where k=1, is set. For that, the signal processor 215 may control the clock generator 213 to generate the multiple RX clock signals (i.e., RxCLK_1, RxCLK_2, . . . , and RxCLK_N) with the RX clock-to-clock delay, d, corresponding to the RX clock sequence, RxCLK_SEQ_k, where =k=1.

In operation S145, the signal processor, 215, sets the range sequence, Range_SEQ, for defining the TX-to-RX delay, Δ. In other words, right after the initialization, the signal processor, 215, may set the clock generator, 213, with the TX-to-RX delay, Δ, corresponding to the range sequence Range_SEQ_j, where j=1.

In operation S150, the signal processor, 215, may control the multiple-TX unit, 230, and the multiple-RX unit, 240, to scan an area corresponding to the predefined directivity and range. In other words, the multiple-TX unit, 230, may generate and emit the TX pulses according to the TX clock sequence, TxCLK_SEQ_i, defined in operation S120. In addition, the signal processor, 215, may control the multiple-RX unit, 240, to receive echo pulses after the TX-to-RX delay, Δ, corresponding to the range sequence, Range_SEQ_j set in operation S145. The multiple-RX unit, 240, may receive the echo pulses using the multiple RX antennas according to the RX clock sequence, RxCLK_SEQ_k, predefined in operation S135. At this point, it would be well understood that TXs and RXs may be repeated the preset number of times under the conditions of the identical TX clock sequence, TxCLK_SEQ_i, range sequence, Range_SEQ_j, and RX clock sequence RxCLK_SEQ_k. An SNR of the received signal may be enhanced through repetitive radar scans for the identical distance and position.

In operation S161, the signal processor, 215, checks whether scans for all the ranges are completed. For example, the signal processor, 215, determines whether scans using all the set range sequences, Range_SEQ_j, are completed. When the scans corresponding to all the range sequences, Range_SEQ_j, are completed (to Yes direction), the procedure proceeds to operation S171. On the contrary, when all the set range sequences, Range_SEQ_j, are not detected (to No direction), the procedure proceeds to operation S166.

In operation S166, the signal processor, 215, changes the range sequence, Range_SEQ, for selecting a distance to a detection range. In other words, the signal processor, 215, may increase variable j of the range sequence, Range_SEQ_j, to (j+1). Then, returning to operation S145, the signal processor 215 may set the clock generator, 213, to have the TX-to-RX delay, Δ, corresponding to the changed range sequence, Range_SEQ. In addition, the signal processor, 215, performs an operation loop S145→S150→S161→S166 for performing radar scan while changing the RX clock sequence under conditions of the TX clock sequence, TxCLK_SEQ_i, set in operation S120 and the changed range sequence.

In operation S171, the signal processor, 215, checks whether radar scans for all the RX directions are completed. For example, the signal processor, 215, determines whether scans using all the set RX clock sequences, RxCLK_SEQ_k, are completed. When it is determined that RX pulses corresponding to all the RX clock sequence, RxCLK_SEQ_k, are completed (to Yes direction), the procedure proceeds to operation S180. On the contrary, when the set RX clock sequences, RxCLK_SEQ_k, are not fully used (to No direction), the procedure proceeds to operation S176.

In operation S176, the signal processor, 215, changes the RX clock sequence, RxCLK_SEQ_k, for adjusting the directivity of the multiple-RX unit, 240. In other words, the signal processor, 215, may increase variable k of the RX clock sequence, RxCLK_SEQ_k to (k+1). Then, the procedure returns to operation S135. In addition, the signal processor, 215, may set the clock generator, 213, to have the RX clock-to-clock delay, d, corresponding to the changed RX clock sequence, RxCLK_SEQ_(k+1). In addition, the pulse radar device 200 may emit the TX pulse and receive the echo pulse according to the TX clock sequence, TxCLK_SEQ_i, and the range sequence, Range_SEQ_k, set in operations S120 and S145, respectively.

In operation S180, the signal processor, 215, checks whether scans in all TX directions are completed. The signal processor, 215, determines whether scans using all the predefined TX clock sequences, TxCLK_SEQ_i, are completed. When the scans corresponding to all the TX clock sequences, TxCLK_SEQ_i, are completed (to Yes direction), the procedure proceeds to operation S190. On the contrary, when the predefined TX clock sequences, TxCLK_SEQ_i, are not fully used (to No direction), the procedure proceeds to operation S185.

In operation S185, the signal processor, 215, changes the TX clock sequence, TxCLK_SEQ_i, for changing the directivity of the TX pulse. In other words, the signal processor, 215, may increase variable i of the TX clock sequence, TxCLK_SEQ_i, to (i+1). Then, the procedure returns to operation S120. In addition, the signal processor, 215, may set the clock generator, 213, to have the TX clock-to-clock delay, δ, corresponding to the changed TX clock sequence, TxCLK_SEQ_i. In addition, with newly changed TX clock sequence, TxCLK_SEQ_i, the signal processor, 215, may process an RX clock sequence adjusting loop and a range sequence adjusting loop.

In operation S190, the signal processor, 215, may obtain the information on a position of or a distance to a target, a type of the target, or the movements of the target by analyzing the scan results for all directions and ranges. In other words, the signal processor, 215, may analyze features of the target using the radar scan results for all the set TX clock sequences, TxCLK_SEQ_i, range sequences, Range_SEQ_j, and RX clock sequences, RxCLK_SEQ_k.

Figure 8:
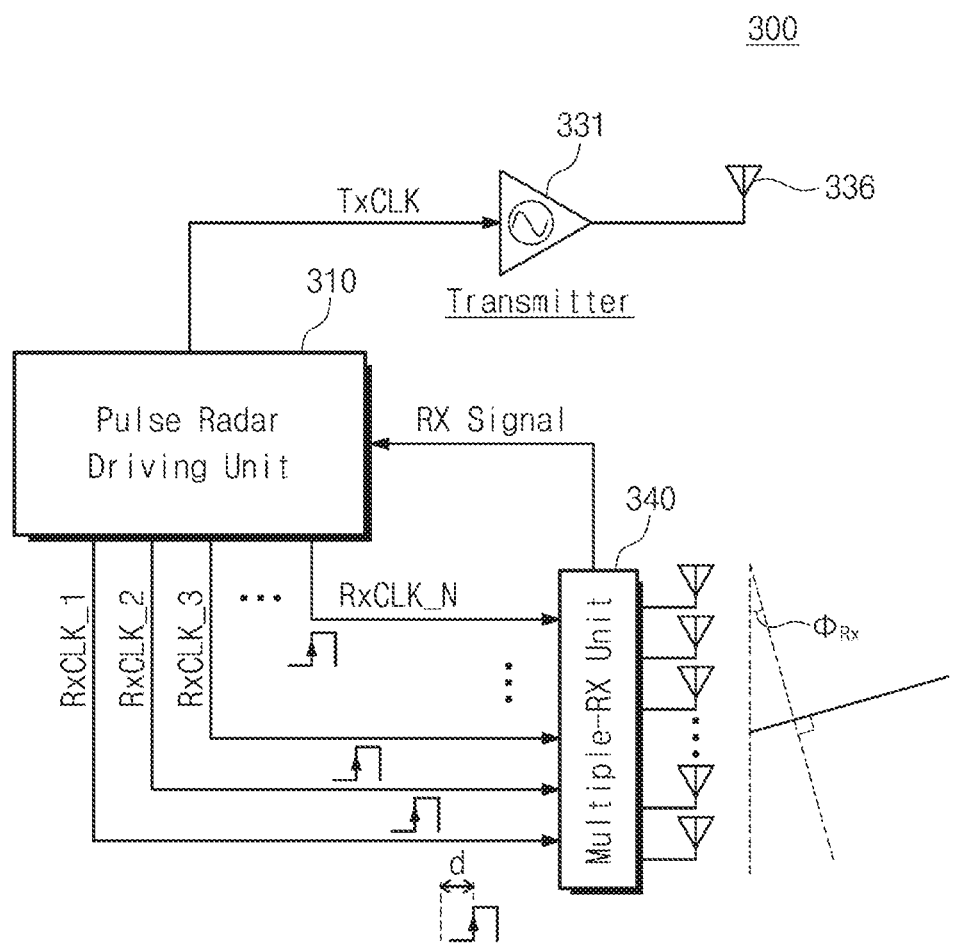
FIG. 8 is a block diagram showing a pulse radar device according to another embodiment of the present inventive concept.

FIG. 8 is a block diagram showing a pulse radar device according to another embodiment of the present inventive concept. Referring to FIG. 8, the pulse radar device, 300, may include a pulse radar driving unit, 310, a transmitter, 331, and a multiple-RX unit, 340.

The pulse radar driving unit, 310, generates a TX clock signal, TxCLK, for the transmitter, 331, by utilizing a source clock signal (or a reference clock signal). In addition, the pulse radar driving unit, 310, may generate multiple RX clock signals (i.e., RxCLK_1, RxCLK_2, . . . , and RxCLK_N), where N is a natural number, to be provided to the multiple-RX unit, 340. The multiple RX clock signals (i.e., RxCLK_1, RxCLK_2, . . . , and RxCLK_N) may have a time difference of an RX clock-to-clock delay, d, therebetween. In other words, a second RX clock signal, RxCLK_2 is a clock signal delayed by the RX clock-to-clock delay, d, in comparison to a first RX clock signal, RxCLK_1. A third RX clock signal, RxCLK_3, is a clock signal delayed by the RX clock-to-clock delay, d, in comparison to the second RX clock signal, RxCLK_2.

Here, the RX clock-to-clock delay, d, that is a time difference between the multiple RX clock signals (i.e., RxCLK_1, RxCLK_2, . . . , and RxCLK_N) may be adjusted to various values. For example, the RX clock-to-clock delay, d, may be a positive, 0, or a negative value. In other words, the RX clock signals (i.e., RxCLK_1, RxCLK_2, . . . , and RxCLK_N) may have a reverse sequence according to the magnitude of the RX clock-to-clock delay, d.

The multiple RX clock signals (i.e., RxCLK_1, RxCLK_2, . . . , and RxCLK_N) sequentially delayed by the RX clock-to-clock delay, d, are applied to the multiple-RX unit, 340. The multiple-RX unit, 340, has samplers that correspond to a plurality of RX antennas, Ant_Rx. The samplers may be driven by the RX clock signals (i.e., RxCLK_1, RxCLK_2, . . . , and RxCLK_N) to receive echo pulses. RX signals having been received through the respective RX antennas, Ant_Rx, may be transferred to the pulse radar driving unit to be analyzed.

The directivity of the multiple-RX unit, 340, may be defined by the RX clock-to-clock delay, d, according to the respective RX clock signals (i.e., RxCLK_1, RxCLK_2, . . . , and RxCLK_N). In other words, the directivity of the multiple-RX unit, 340, may be controlled according to the magnitude of the RX clock-to-clock delay, d.

Although not illustrated, a detection range may be determined through adjustment of an interval between emission of one TX pulse and RX of an echo pulse.

In the present inventive concept, the pulse radar driving unit, 310, may control the magnitude of a TX-to-RX delay, Δ, between the TX clock signal and the RX clock signal to select a detection range.

Hereinbefore, a brief description has been provided about the pulse radar device, 300, that includes a single transmitter and multiple receivers. The radar device, 300, is able to adjust the directivity using a clock signal. When the signal transmitter, 331, is used, even if the directivity of the TX pulse is fixed, the range and directivity of the multiple-RX unit, 340, may be freely adjusted.

Figure 9:
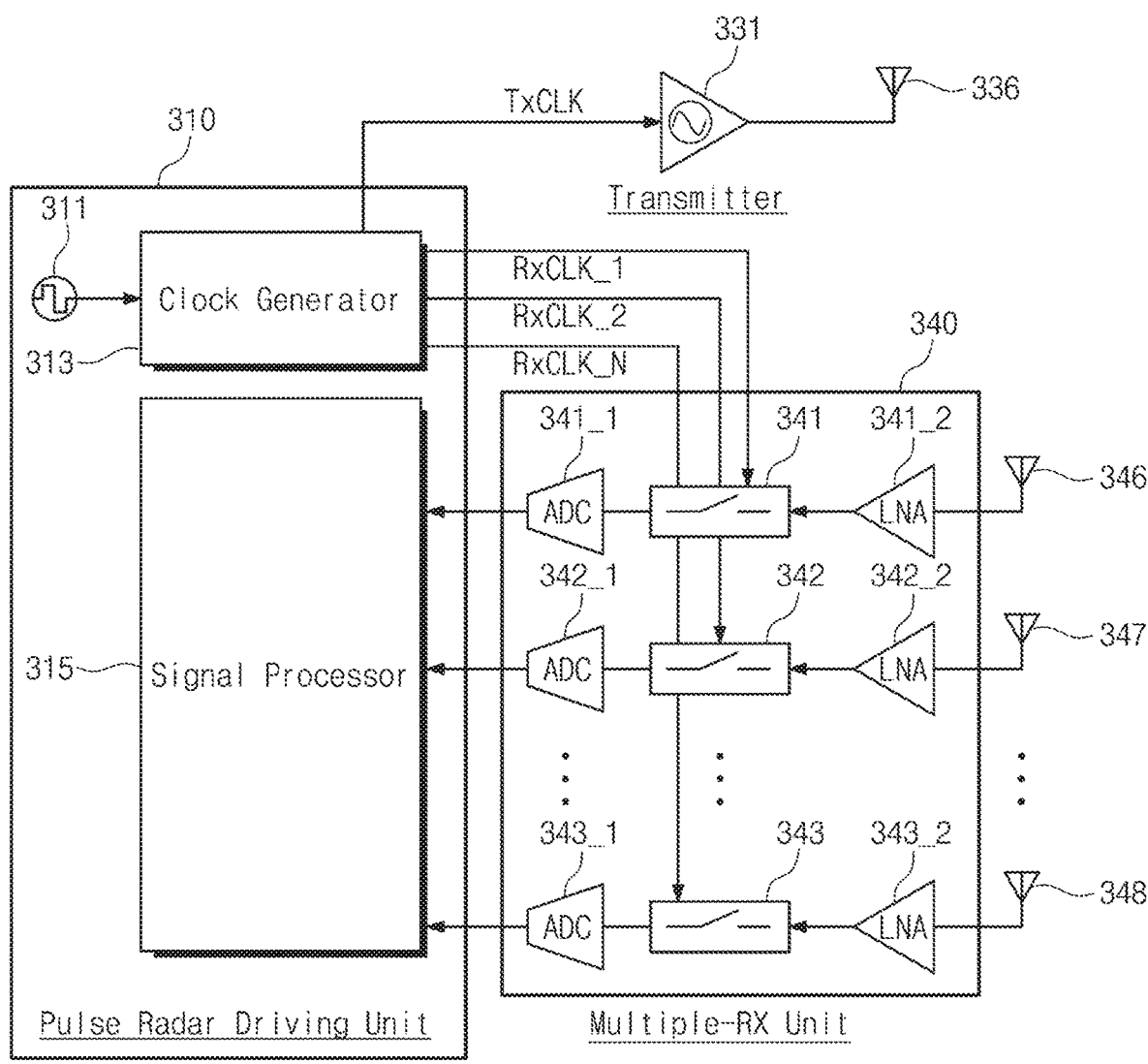
FIG. 9 is a block diagram showing a detailed example of the pulse radar device of FIG. 8.

FIG. 9 is a block diagram showing a detailed example of the pulse radar device of FIG. 8. Referring to FIG. 9, the pulse radar device, 300, may include a pulse radar driving unit, 310, a single transmitter, 331, and a multiple-RX unit, 340.

The pulse radar driving unit, 310, includes a clock generator, 313, and a signal processor, 315. The clock generator, 313, uses a reference clock, 311, to generate a single TX clock signal, TxCLK, and multiple RX clock signals (i.e., RxCLK_1, RxCLK_2, . . . , and RxCLK_N). The clock generator, 313, may include, for example, a delay locked loop (DLL) or a phase locked loop (PLL). The clock generator, 313, may generate the single TX clock signal, TxCLK, and the multiple RX clock signals (i.e., RxCLK_1, RxCLK_2, . . . , and RxCLK_N) from the reference clock, 311, using the DLL or PLL.

The signal processor, 315, may set the clock generator, 313, to generate the multiple RX clock signals (i.e., RxCLK_1, RxCLK_2, . . . , and RxCLK_N) according to a preset RX clock-to-clock delay, d. The signal processor, 315, may also receive signals having been received from the multiple-RX unit, 340. The signal processor, 315, may analyze target information using the received signals. For example, the signal processor, 315, may analyze the received signals to analyze position information such as an orientation of or a distance to the target. Alternatively, the signal processor, 315, may also combine the RX signals to detect a type or movement of the target.

By utilizing the single TX clock signal, TxCLK, having a specific pulse repetition period, the single transmitter, 331, and a TX antenna, 336, generate and emit a TX pulse signal into a space or a specific medium. Here, according to technical features of the present inventive concept, an antenna is not the only means for emitting a TX pulse into a space. For example, it would be well understood to those skilled in the art that the TX antenna may be replaced by various means for emitting the TX pulse into a space filled with various media. For example, it would be well understood that, for emitting the TX pulse into a fluid filled medium such as water, a different means functioning as a TX antenna is required. In some applications of the invention, a medium for the TX pulses may be a cable or an iron rod. For such cases, the features of the present inventive concept may be applied by observing a reflection pulse from the discontinuous interface of the medium lying.

The multiple-RX unit, 340, may have a specific RX directivity, $\varphi_{Rx}$, using the multiple RX clock signals (i.e., RxCLK_1, RxCLK_2, . . . , and RxCLK_N). The multiple-RX unit, 340, may include a plurality of broadband samplers (i.e., 341, 342 and 343), and a plurality of RX antennas (i.e., 346, 347 and 348). In addition, the multiple-RX unit, 340, may further include low noise amplifiers (i.e., 341_2, 342_2, and 343_2) for amplifying signals received from the plurality of RX antennas 346, 347, and 348, and analog-to-digital converters 341_1, 342_1, and 343_1. RX signals respectively received from the plurality of RX antennas (i.e., 346, 347, and 348) are amplified by the low noise amplifiers (i.e., 341_2, 342_2, and 343_2). The amplified RX signals are sampled by the broadband samplers (i.e., 341, 342, and 343) using the multiple RX clock signals (i.e., RxCLK_1, RxCLK_2, . . . , and RxCLK_N). In addition, the sampled signals are converted into digital signals by the analog-to-digital converters (i.e., 341_1, 342_1, and 343_1). The digital signals may be transferred to the signal processor, 315.

The pulse radar device, 300, having a structure of the single transmitter, 331, of the present inventive concept may operate to emit the TX pulse to all directions where a target possibly exists. To control a detection range and the directivity of the multiple-RX unit, 340, the pulse radar, 300, may change the range sequence and RX clock sequence.

Figure 10:
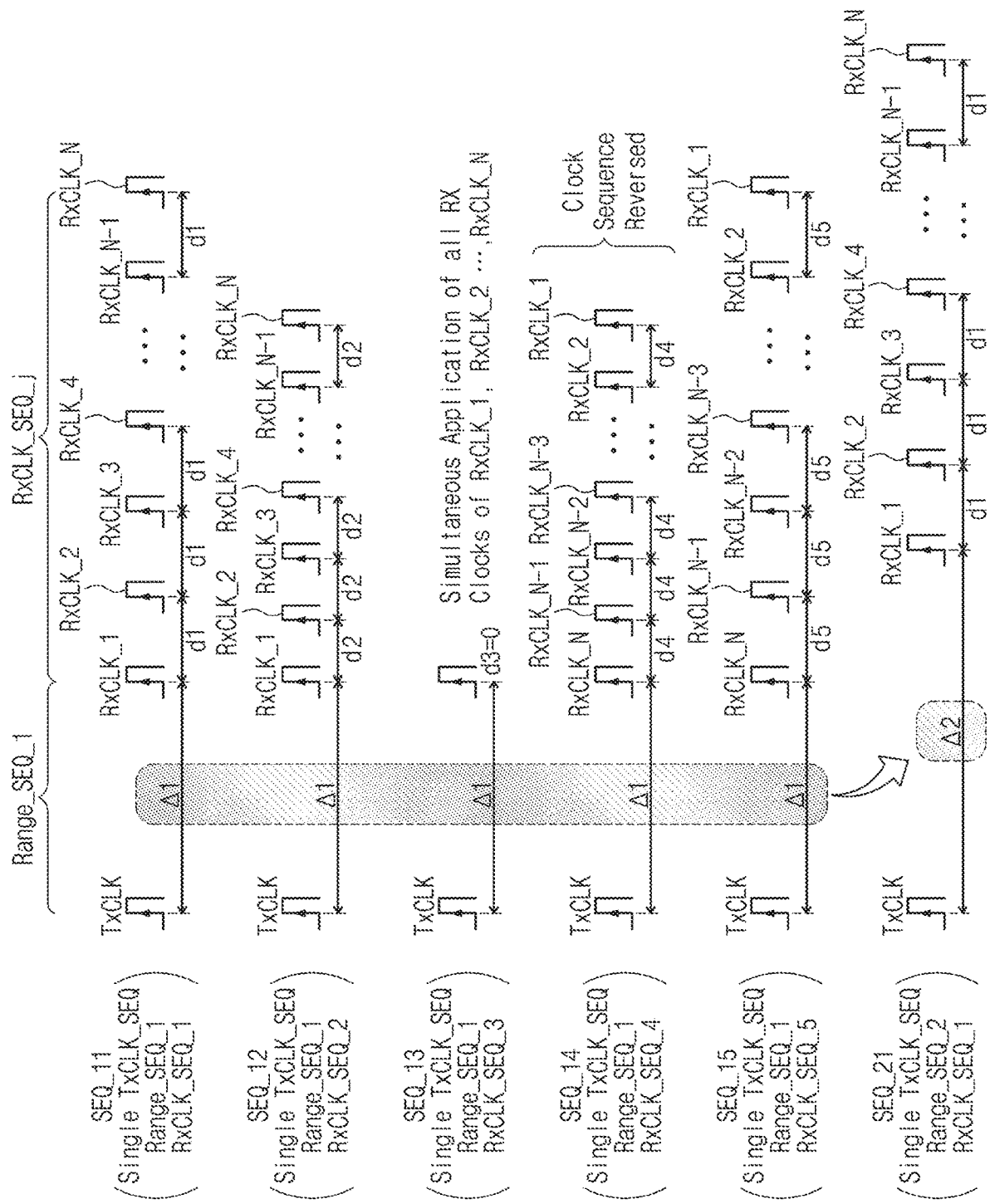
FIG. 10 is a timing diagram showing an operation of the pulse radar device of FIG. 9.

FIG. 10 is a timing diagram showing an operation of the pulse radar device of FIG. 9. In relation to FIG. 10, a method for controlling the pulse radar device, 300, (i.e., selecting the directivity of the RX pulse and the detection range) will be presented. Under the single transmitter condition, the TX clock is fixed to a single clock sequence, Single TxCLK_SEQ. In addition, the range and the multiple RX clock signals (i.e., RxCLK_1, RxCLK_2, . . . , and RxCLK_N) may be classified to a sequence according to the delay magnitude.

Sequence SEQ_11 indicates a combination of a first range sequence, Range_SEQ_1 and a first RX clock sequence, RxCLK_SEQ_1. In all the sequences, the TX clock is the same as the single clock sequence, Single TxCLK_SEQ. In other words, the TX clock signal, TxCLK, is fixed. In sequence SEQ_11, the TX clock signal, TxCLK, and the multiple RX clock signals (i.e., RxCLK_1, RxCLK_2, . . . , and RxCLK_N) are set to have a first TX-to-RX delay, Δ1. Furthermore, in sequence SEQ_11, the first RX clock sequence, RxCLK_SEQ_1, is used to indicate that the RX clock-to-clock delay between the multiple RX clock signals (i.e., RxCLK_1, RxCLK_2, . . . , and RxCLK_N) is 'd1'.

Sequence SEQ_12 indicates a combination of the first range sequence, Range_SEQ_1 and a second RX clock sequence, RxCLK_SEQ_2. In other words, sequence SEQ_12 indicates that the RX clock-to-clock delay of the multiple RX clock signals (i.e., RxCLK_1, RxCLK_2, . . . , and RxCLK_N) is changed to 'd2' in comparison to sequence SEQ_11. It may be seen that in sequence SEQ_12 as illustrated, the RX clock-to-clock delay between the multiple RX clock signals (i.e., RxCLK_1, RxCLK_2, . . . , and RxCLK_N) is reduced in comparison to sequence SEQ_11. Such a condition means that for sequence SEQ_12, the directivity of the multiple-RX unit, 340, is changed in comparison to sequence SEQ_11.

Sequence SEQ_13 indicates a clock sequence having an adjusted directivity of the receiver in comparison to sequence SEQ_12. In other words, a single TX clock sequence, Single TxCLK_SEQ, and the first range sequence, Range_SEQ_1 of sequence SEQ_13 are the same as those of sequence SEQ_12. However, sequence SEQ_13 indicates that each of the multiple RX clock signals (i.e., RxCLK_1, RxCLK_2, . . . , and RxCLK_N) is set to have a zero delay (d3=0). In other words, under the condition of sequence SEQ_13, the multiple RX clock signals (i.e., RxCLK_1, RxCLK_2, . . . , and RxCLK_N) are applied at the same time.

In the above-described manner, sequences SEQ_14 and SEQ_15 adjust only the directivity of the multiple-RX unit, 340, with the TX clock sequence and the range sequence maintained. However, sequences SEQ_14 and SEQ_15 show that an order of the RX clock is reversed in comparison to sequences SEQ_11 and SEQ_12. Furthermore, sequence SEQ_15 includes an RX clock sequence, RxCLK_SEQ_5, having an adjusted directivity of the multiple-RX unit, 340, in comparison to sequence SEQ_14.

Sequence SEQ_21 shows a clock state where a range sequence is changed in comparison to sequences from SEQ_11 to SEQ_15. The pulse radar device, 300, may receive RX pulses in various directions at a range corresponding to a first TX-to-RX delay, Δ1. However, for sequence SEQ_21, the pulse radar device, 300, may receive RX pulses with various RX directivities at a different range corresponding to a second TX-to-RX delay, Δ2.

Sequence SEQ_21 indicates a combination of the second range sequence, Range_SEQ_2, and the first RX clock sequence, RxCLK_SEQ_1. The TX clock is a single clock signal, and a single sequence exists. The single TX clock sequence, TxCLK_SEQ, is identical to that of sequence SEQ_11 to SEQ_15. In addition, under a clock condition of sequence SEQ_21, a TX-to-RX delay between the TX clock signal, TxCLK, and the multiple RX clock signals (i.e., RxCLK_1, RxCLK_2, . . . , and RxCLK_N) is set to a second TX-to-RX delay, Δ2. Furthermore, the first RX clock sequence, RxCLK_SEQ_1, is provided and the RX clock-to-clock delay between the multiple RX clock signals (i.e., RxCLK_1, RxCLK_2, . . . , and RxCLK_N) may be set to 'd1'. Although not illustrated, under clock conditions corresponding to subsequent sequences SEQ_22 to SEQ_25, the RX clock-to-clock delay and order of the multiple RX clock signals (i.e., RxCLK_1, RxCLK_2, . . . , and RxCLK_N) may also be adjusted for changing the RX directivity.

Hereinbefore, the description for the pulse radar device, 300, having a single transmitter has been provided. An example has been shown in which the range sequence, Range_SEQ_j, and the RX clock sequence, RxCLK_SEQ_k, are adjusted under the fixed TX clock condition. Through such clock sequence adjustment, the pulse radar device, 300, of the present inventive concept may easily perform a detection range selection and RX directivity control under the single transmitter condition.

The illustrated sequence change is just an example for assisting understanding of the present inventive concept. In other words, it would be well understood that clock setting may be performed in a manner that the range sequence, Range_SEQ_j, is sequentially changed with the fixed RX clock sequence, RxCLK_SEQ_k. And after the change in the range sequence, Range_SEQ_j, is completed, the RX clock sequence is changed.

Figure 11:
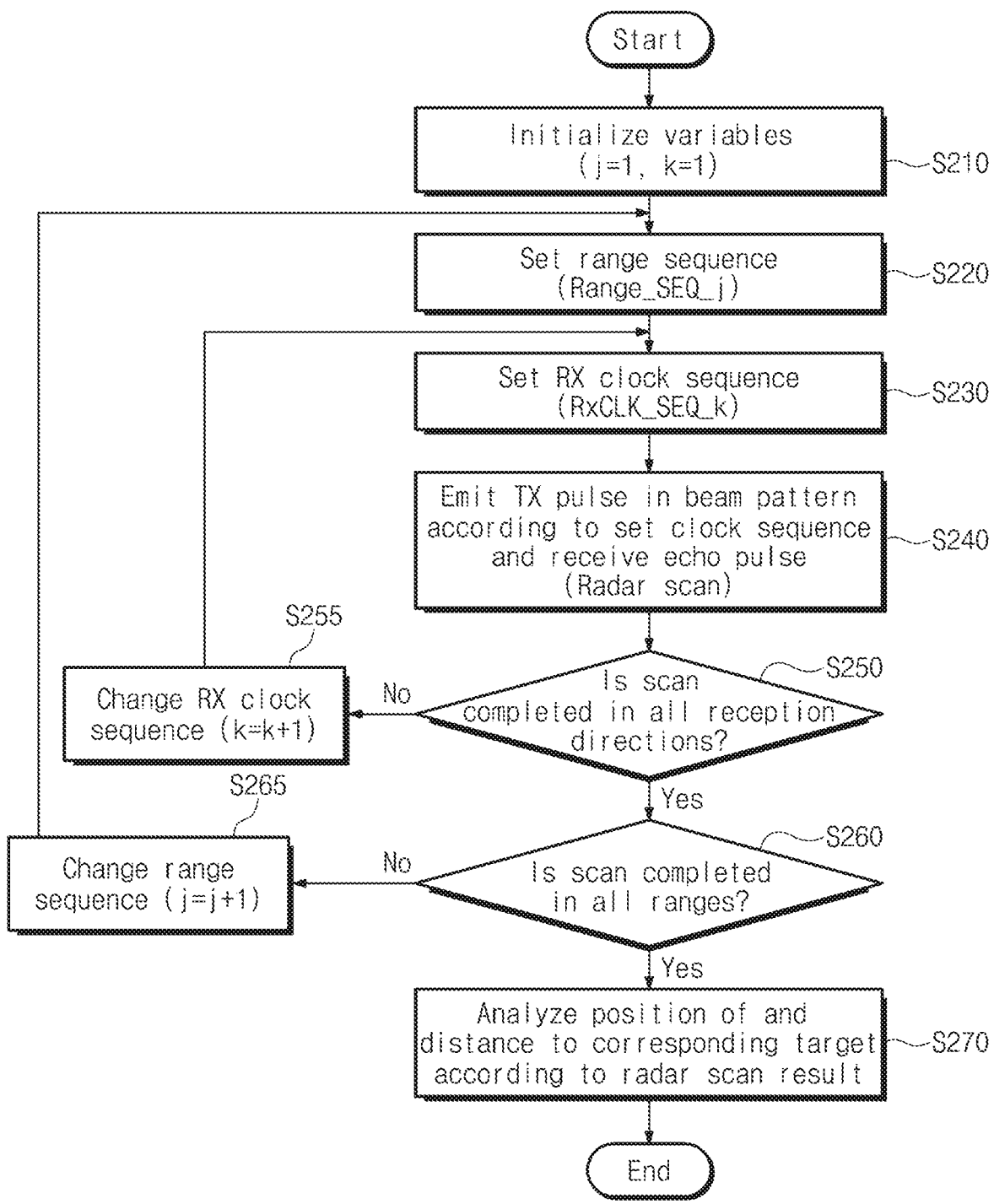
FIG. 11 is a flowchart exemplarily showing a method of adjusting a directivity of the pulse radar device 300 of FIG. 8.

FIG. 11 is a flowchart exemplarily showing a method for adjusting a directivity of the pulse radar device, 300, of FIG. 8. In relation to FIG. 11, an explanation will be presented on a method for controlling the directivity and range of the multiple-RX unit, 340, in the pulse radar device, 300, including the single transmitter, 331, and the multiple-RX unit, 340.

In operation S210, the signal processor, 315, of the pulse radar device, 300, initializes variables j and k to j=k=1. Here, since a clock provided to the single transmitter, 331, is a single clock, it is not necessary to adjust TX sequence, TxCLK_SEQ. Variable j is a value for selecting the range sequence, Range_SEQ, and variable k is a value for selecting the RX clock sequence, RxCLK_SEQ.

In operation S220, the signal processor, 315, sets the range sequence, Range_SEQ_j, for defining the TX-to-RX delay, Δ, between the single TX clock signal and the multiple RX clock signals. In other words, right after the initialization, the signal processor 315 may set the clock generator, 313, with the first TX-to-RX delay, Δ1, corresponding to the range sequence, Range_SEQ_j, where j=1.

In operation S230, the signal processor, 315, may set the clock generator, 313, to generate the multiple RX clock signals (i.e., RxCLK_1, RxCLK_2, . . . , and RxCLK_N) corresponding to the RX clock sequence, RxCLK_SEQ_k. Right after the initialization, the signal processor, 315, may control the clock generator, 313, to generate the multiple RX clock signals (i.e., RxCLK_1, RxCLK_2, . . . , and RxCLK_N) in a time interval of the RX clock-to-clock delay, d1, corresponding to the RX clock sequence, RxCLK_ SEQ_k, where k=1.

In operation S240, the signal processor, 315, may control the single transmitter, 331, and the multiple-RX unit, 340, to scan a detection range corresponding to the predefined directivity and range of the multiple-RX unit, 340. In other words, by utilizing a single TX clock signal, TxCLK, having a pulse period, the single transmitter, 331, may generate and emit TX pulses. In addition, the signal processor 315 may control the multiple-RX unit, 340, to receive echo pulses after the first TX-to-RX delay, Δ1, corresponding to the range sequence, Range_SEQ_1, defined in operation S220. The multiple-RX unit, 340, may receive echo signals using multiple RX antennas according to the RX clock sequence, RxCLK_SEQ_1, defined in operation S230.

In operation S250, the signal processor, 315, checks whether receptions from all RX directions are completed. For example, the signal processor, 315, determines whether scans using all the set RX clock sequences, RxCLK_SEQ_k, are completed. When RX pulses corresponding to all the RX clock sequences, RxCLK_SEQ_k, are received (to Yes direction), the procedure proceeds to operation S260. On the contrary, when the set RX clock sequences, RxCLK_ SEQ_k, are not fully used (to No direction), the procedure proceeds to operation S255.

In operation S255, the signal processor, 315, changes the RX clock sequence, RxCLK_SEQ_k, for adjusting the directivity of the RX pulse. In other words, the signal processor, 315, may increase variable, k, of the RX clock sequence, RxCLK_SEQ_k, to (k+1). Then, the procedure returns to operation S230. In addition, the signal processor, 315, may set the clock generator, 313, to have an RX clock-to-clock delay, d2, corresponding to the changed RX clock sequence, RxCLK_SEQ. In addition, the pulse radar device, 300, may emit the TX pulse and receive the echo pulse according to the range sequence, Range_SEQ_j, set in operation S220. Such an operation loop S230→S240→S250→S255 may be repeated until the radar scans in all the preset RX directions are completed.

In operation S260, the signal processor, 315, checks whether scans for all the ranges are completed. For example, the signal processor 315 determines whether scans using all the defined range sequences, Range_SEQ_j, are completed. When the scans corresponding to all the range sequences, Range_SEQ_j, are completed (to Yes direction), the procedure proceeds to operation S270. On the contrary, when all the defined range sequences, Range_SEQ_j, are not scanned (to No direction), the procedure proceeds to operation S265.

In operation S265, the signal processor, 315, changes the range sequence, Range_SEQ, for selecting a detection range. In other words, the signal processor, 315, may increase variable j of the range sequence, Range_SEQ_j, to (j+1). Then, the procedure returns to operation S220. In addition, the signal processor, 315, may set the clock generator, 313, to have a second TX-to-RX delay, Δ2, corresponding to the changed range sequence, Range_SEQ. In addition, the signal processor, 315, may execute an operation loop S230→S240→S250→S255 for performing scans while changing an RX clock sequence under the changed range sequence condition.

In operation S270, the signal processor 315 may obtain information on a position of or a distance to a target, a type of the target, or the movement of the target by using scan results for all the adjustable directions and ranges. In other words, the signal processor, 315, may analyze features of the target using the scan results for the set range sequence, Range_SEQ_j, and the RX clock sequence, RxCLK_SEQ_k.

The above-described embodiment adopts a scheme in which the signal processor 315 changes and scans all the set range sequence, Range_SEQ_j, and the RX clock sequence, RxCLK_SEQ_k, and then uses the results thereof. However, a combination of variables j and k of all changeable sequences is not necessarily to be sequential at all time. In other words, variables j and k of all the changeable sequences may be defined in an active scan control scheme in which a partial area is detected and then a subsequent sequence combination is scanned. In other words, it may be realized that the position in operation S270 of FIG. 11 is changed to perform a radar scan, and a next sequence combination is taken according to the analysis result thereof.

The illustrated flowchart is just for explaining an embodiment in which the RX clock sequence, RxCLK_SEQ_k, is changed and then the range sequence, Range_SEQ_j, is changed. The embodiment of the inventive concept is not limited thereto. For example, under a condition of a fixed RX clock sequence, RxCLK_SEQ_k, the range sequence, Range_SEQ_j, is sequentially changed. After completion of changing the range sequence, Range_SEQ_j, the RX clock sequence, RxCLK_SEQ_k, may be changed.

Hereinbefore, an operation method of the pulse radar device, 300, has been briefly described which uses a single transmitter and multiple receivers illustrated in FIGS. 8 and 9. In this case, the TX clock signal is fixed, but the range sequence, Range_SEQ_j, and the RX clock sequence, RxCLK_SEQ_k, may be changed. Therefore, the pulse radar device, 300, may provide high directivity characteristics.

Figure 12:
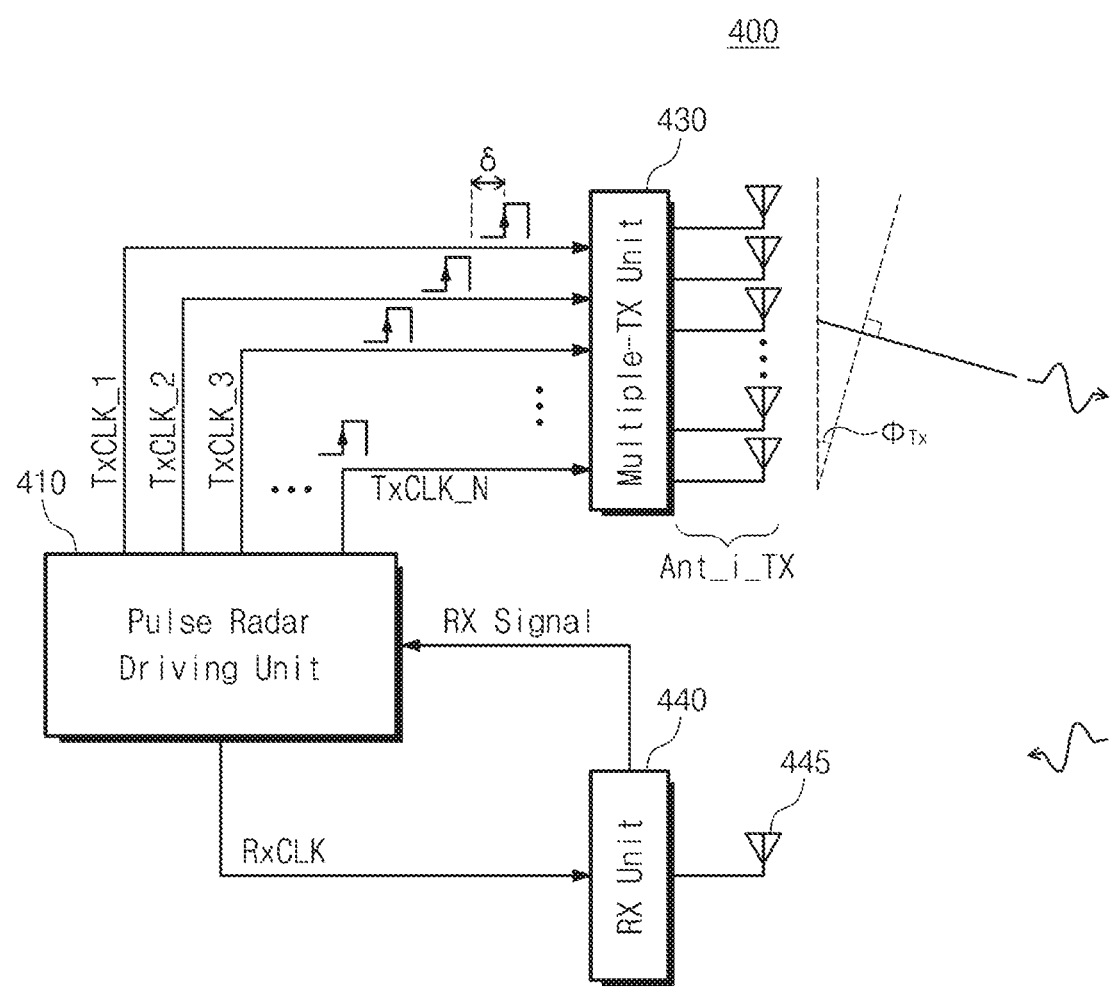
FIG. 12 is a block diagram showing a pulse radar device according to another embodiment of the present inventive concept.

FIG. 12 is a block diagram showing a pulse radar device according to another embodiment of the present inventive concept. Referring to FIG. 12, the pulse radar device, 400, may include a pulse radar driving unit, 410, a multiple-TX unit, 430, and a single RX unit, 440. Here, similarly to the multiple-RX unit, 340, of FIG. 9, the RX unit, 440, may further include a broadband sampler, a low noise amplifier and an analog-digital converter (ADC). However, such a detailed configuration of the RX unit, 440, has been described in detail in relation to FIG. 9, and therefore it will be briefly represented here.

The pulse radar driving unit, 410, generates, from a source clock signal (or a reference clock signal), multiple TX clock signals (i.e., TxCLK_1, TxCLK_2, ..., TxCLK_N), where N is a natural number, to be provided to the multiple-TX unit, 430. In addition, the pulse radar driving unit, 410, may generate, from the source clock signal, an RX clock signal, RxCLK, to be provided to the RX unit, 440.

The multiple TX clock signals (i.e., TxCLK_1, TxCLK_2, ..., and TxCLK_N) may have a time difference of a TX clock-to-clock delay, δ, therebetween. In other words, a second TX clock signal, TxCLK_2, is a clock signal delayed by the TX clock-to-clock delay, δ, in comparison to a first TX clock signal, TxCLK_1. A third clock signal, TxCLK_3, is a clock signal delayed by the TX clock-to-clock delay, δ, in comparison to the second TX clock signal, TxCLK_2. Here, the TX clock-to-clock delay, δ, may be adjusted to various values. In other words, the TX clock-to-clock delay, δ, may be a positive number, 0, or a negative number. For example, the TX clock signals (i.e., TxCLK_1, TxCLK_2, ..., and TxCLK_N) may have a reverse sequence with a time interval of the TX clock-to-clock delay, δ. The plurality of TX clock signals (i.e., TxCLK_1, TxCLK_2, ..., and TxCLK_N) sequentially delayed by the TX clock-to-clock delay, δ, are applied to the multiple-TX unit, 430. The RX unit, 440, uses the RX clock signal, RxCLK, to receive an echo pulse having been received through the RX antenna, 445.

Hereinbefore, the brief description has been provided about the pulse radar device, 400, that includes a single receiver and multiple transmitters. The radar device, 400, adjusts the directivity using the clock signals.

Figure 13:
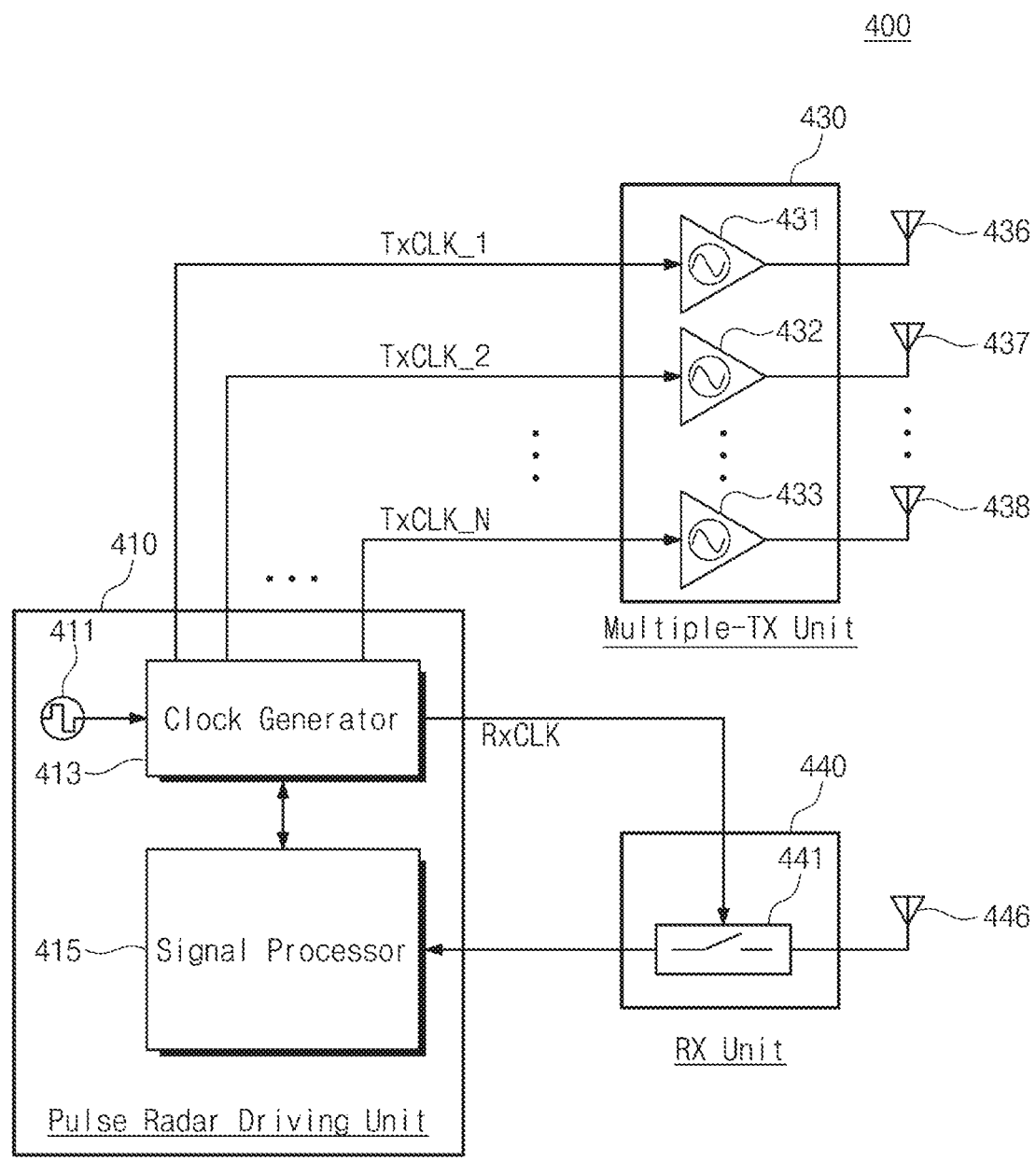
FIG. 13 is a block diagram showing a detailed example of the pulse radar device of FIG. 12.

FIG. 13 is a block diagram showing a detailed example of the pulse radar device of FIG. 12. Referring to FIG. 13, the pulse radar device, 400, may include a pulse radar driving unit, 410, a multiple-TX unit, 430, and an RX unit, 440.

The pulse radar driving unit, 410, includes a clock generator, 413, and a signal processor, 415. The clock generator, 413, generates multiple TX clock signals (i.e., TxCLK_1, TxCLK_2, ..., and TxCLK_N) and a single RX clock signal, RxCLK, using a reference clock, 411. The clock generator, 413, may include, for example, a delay locked loop (DLL) or a phase locked loop (PLL). The clock generator, 413, may generate, from the reference clock, 411, the multiple TX clock signals (i.e., TxCLK_1, TxCLK_2, ..., and TxCLK_N) and the single RX clock signal, RxCLK, using the DLL or PLL.

The signal processor, 415, may set the clock generator, 413, to generate the multiple TX clock signals (i.e., TxCLK_1, TxCLK_2, ..., and TxCLK_N) according to a preset value of the TX clock-to-clock delay, δ. In addition, the signal processor, 415, receives signals from the RX unit, 440. The signal processor, 415, may use the received signals to obtain target information. For example, the signal processor, 415, may analyze the received signals to analyze position information such as an orientation of or a distance to the target. Alternatively, the signal processor, 415, may combine the RX signals to detect a type or a movement of the target.

The multiple-TX unit, 430, and the TX antennas may generate pulse signals using the multiple TX clock signals (i.e., TxCLK_1, TxCLK_2, ..., and TxCLK_N). The TX pulse signals are emitted to a space or a specific medium. Here, according to technical features of the present inventive concept, the TX antenna is not the only means for emitting the TX pulse into a space. For example, it would be well understood to those skilled in the art that the TX antenna may be replaced by various means for emitting the TX pulses into a space filled with various media. For example, for emitting the TX pulse into a fluid filled medium such as water, a new type of device is required which corresponds to the TX antenna. In addition, a case where a medium to which the TX pulse is emitted is a cable or an iron rod, the features of the present inventive concept may be applied in a manner in which an echo pulse reflected by the discontinuous interface of the medium is received.

Figure 14:
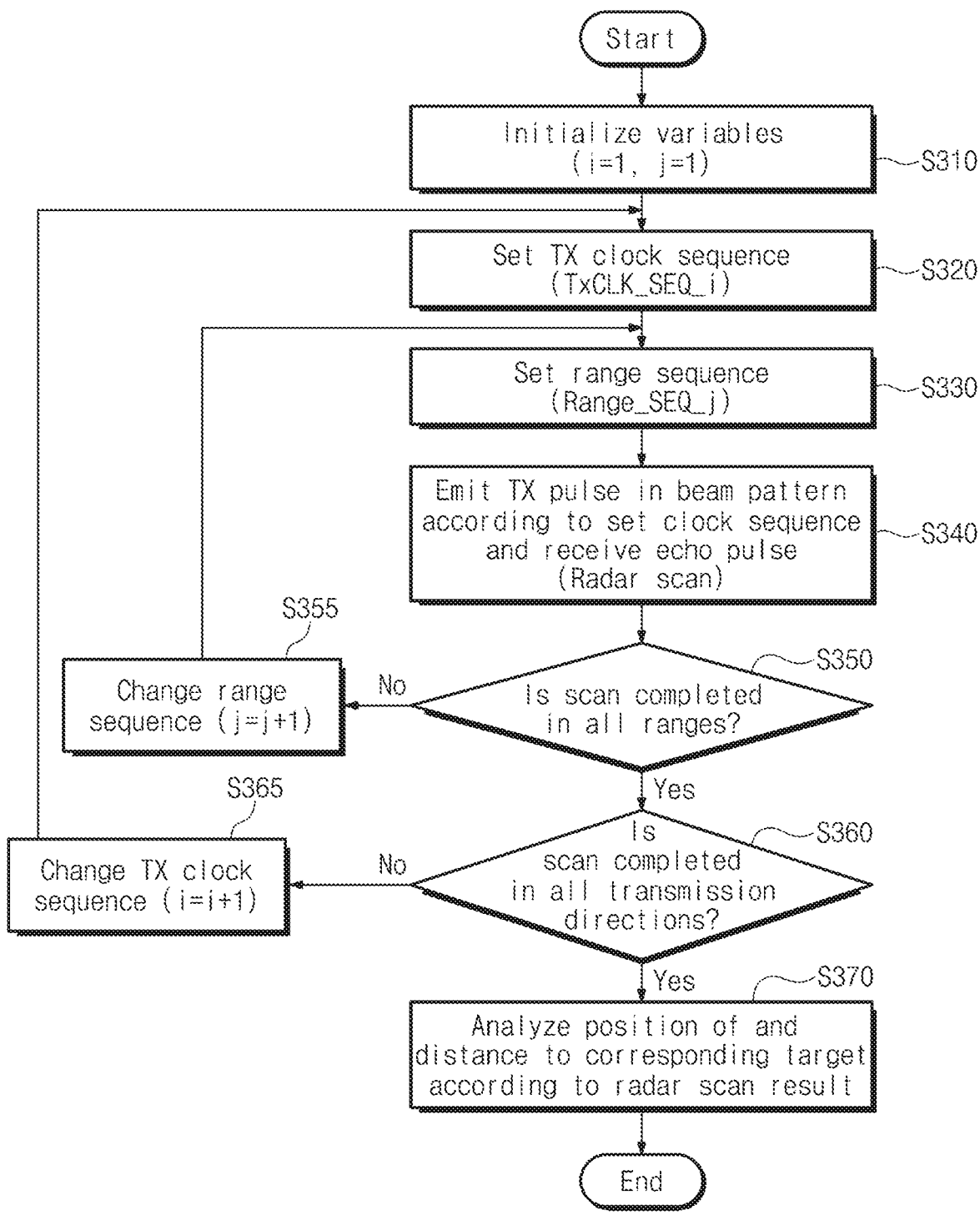
FIG. 14 is a flowchart exemplarily showing a method of adjusting a directivity of the pulse radar device of FIG. 13.

FIG. 14 is a flowchart exemplarily showing a method for adjusting a directivity of the pulse radar device of FIG. 13. Referring to FIG. 14, a description will be presented on a method for controlling the directivity and range of the pulse radar device, 400, including the multiple-TX unit, 430, and the RX unit, 440.

In operation S310, the signal processor, 415, of the pulse radar device, 400, initializes variables i, j and k to i=j=k=1. Here, since a clock signal provided to the RX unit, 440, is a single clock signal, it is not necessary to adjust an RX sequence, RxCLK_SEQ. Here, the variable i is for selecting the TX clock sequence, TxCLK_SEQ. Variable j is for selecting the range sequence, Range_SEQ.

In operation S320, the signal processor 415 may set the clock generator 413 to generate the multiple TX clock signals (i.e., TxCLK_1, TxCLK_2, . . . , and TxCLK_N) corresponding to the TX clock sequence, TxCLK_SEQ_i. Right after the initialization, the signal processor 415 may control the clock generator 413 to generate the multiple TX clock signals (i.e., TxCLK_1, TxCLK_2, . . . , and TxCLK_N) with the TX clock-to-clock delay, δ, corresponding to the TX clock sequence, TxCLK_SEQ_i, where i=1.

In operation S330, the signal processor 415 sets the range sequence, Range_SEQ_j, for defining the TX-to-RX delay, Δ, between the multiple TX clock signals and the single RX clock signal, RxCLK. In other words, right after the initialization, the signal processor, 415, may set the clock generator, 413, with the first TX-to-RX delay, Δ1, corresponding to the range sequence Range_SEQ_j, where j=1.

In operation S340, the signal processor, 415, may control the multiple-TX unit, 430, and the single RX unit, 440, to scan an area corresponding to the predefined range and directivity of the multiple-TX unit 430. In other words, the multiple-TX unit 430 may generate and emit a TX pulse according to the multiple TX clocks (i.e., TxCLK_1, TxCLK_2, . . . , and TxCLK_N). In addition, the signal processor, 415, may control the RX unit, 440, to receive an echo pulse after the first TX-to-RX delay, Δ1, corresponding to the range sequence, Range_SEQ_j, predefined in operation S330.

In operation S350, the signal processor 415 checks whether scans for all the ranges are completed. For example, the signal processor 415 determines whether scans using all the defined range sequences, Range_SEQ_j, are completed. When the scans corresponding to all the range sequences, Range_SEQ_j, are completed (to Yes direction), the procedure proceeds to operation S360. On the contrary, when all the defined range sequences Range_SEQ_j are not scanned (to No direction), the procedure proceeds to operation S355.

In operation S355, the signal processor 415 changes the range sequence, Range_SEQ, for selecting a detection range. In other words, the signal processor, 415, may increase variable j of the range sequence, Range_SEQ_j, to variable (j+1). Then, the procedure returns to operation S330. In addition, the signal processor, 415, may set the clock generator, 413, to have the second TX-to-RX delay, Δ2, corresponding to the changed range sequence, Range_SEQ. In addition, the signal processor, 415, may execute an operation loop S330→S340→S350→S355 for performing a radar scan under the changed range sequence condition.

In operation S360, the signal processor, 415, checks whether scans in all TX directions are completed. The signal processor, 415, determines whether scans using all the set TX clock sequences, TxCLK_SEQ_i, are completed. When the scans corresponding to all the TX clock sequences, TxCLK_SEQ_i, are completed (to Yes direction), the procedure proceeds to operation S370. On the contrary, when the defined TX clock sequences TxCLK_SEQ_i are not fully used (to No direction), the procedure proceeds to operation S365.

In operation S365, the signal processor 415 changes the TX clock sequence, TxCLK_SEQ_i, for changing the directivity of the TX pulse. In other words, the signal processor, 415, may increase variable i of the TX clock sequence, TxCLK_SEQ_i, to (i+1). Then, the procedure returns to operation S320.

In operation S370, the signal processor, 415, may obtain the information on a position of or a distance to a target, a type of the target, or the target movements by analyzing the scan results for all adjustable directions and ranges. In other words, the signal processor 415 may analyze features of the target using the scan results for the set TX clock sequence, TxCLK_SEQ_i, and range sequence, Range_SEQ_j.

The above-described embodiment adopts a scheme in which the signal processor, 415, changes all the set TX clock sequence, TxCLK_SEQ_i, and range sequence, Range_SEQ_j, and uses the results thereof. However, an active scan control is possible which does not sequentially change a combination of variables i and j of all changeable sequences, but detects a partial area and then scans for a next sequence combination. Such a scheme may be realized such that the position in operation S370 of FIG. 14 is rearranged and according to the analysis results, a next sequence combination is taken.

The illustrated flowchart is only for an exemplary embodiment in which the TX clock sequence, TxCLK_SEQ_i, is changed and then the range sequence, Range_SEQ_j, is changed. The embodiment of the inventive concept is not limited thereto. In other words, it would be well understood that a clock setting may be performed in a manner that the TX clock sequence, TxCLK_SEQ_i, is sequentially changed and then the range sequence, Range_SEQ_j, is changed under a condition of a fixed range sequence, Range_SEQ_j.

Figure 15:
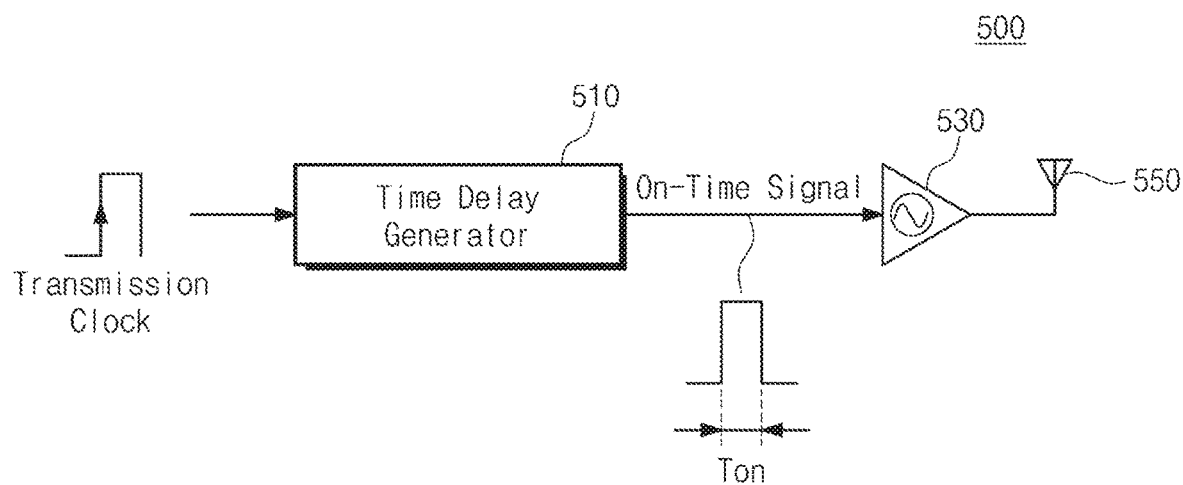
FIG. 15 is a block diagram showing an exemplary transmitter usable in the present inventive concept.

Hereinbefore, operation methods of the pulse radar device, 400, have been briefly described which use the multiple-TX unit 430 and the single RX unit 440 illustrated in FIGS. 12 and 13. In this case, the RX clock signal, RxCLK, is fixed, but the TX clock sequence, TxCLK_SEQ_j, and the range sequence, Range_SEQ_j, may be changed. Therefore, the pulse radar device, 400, may have high directivity characteristics. FIG. 15 is a block diagram showing an exemplary transmitter adoptable in the present inventive concept. Referring to FIG. 15, a transmitter, 500, may include a time delay generator, 510, for generating an on-time signal using a TX clock, a TX pulse generator, 530, and a TX antenna, 550.

The time delay generator, 510, generates the on-time signal from the TX clock. During a predefined ON time, Ton, of the on-time signal, an oscillator included in the TX pulse generator, 530, may be driven. Then, according to the driving of the oscillator, a pulse signal having a desired pulse width is generated. Such a pulse generation technique adopting the time delay generator, 510, may be used as a configuration of a multiple transmitter. Here, the time delay generator, 510, may be configured with various circuits such as a voltage controlled delay line (VCDL) and a logic gate.

Figure 16:
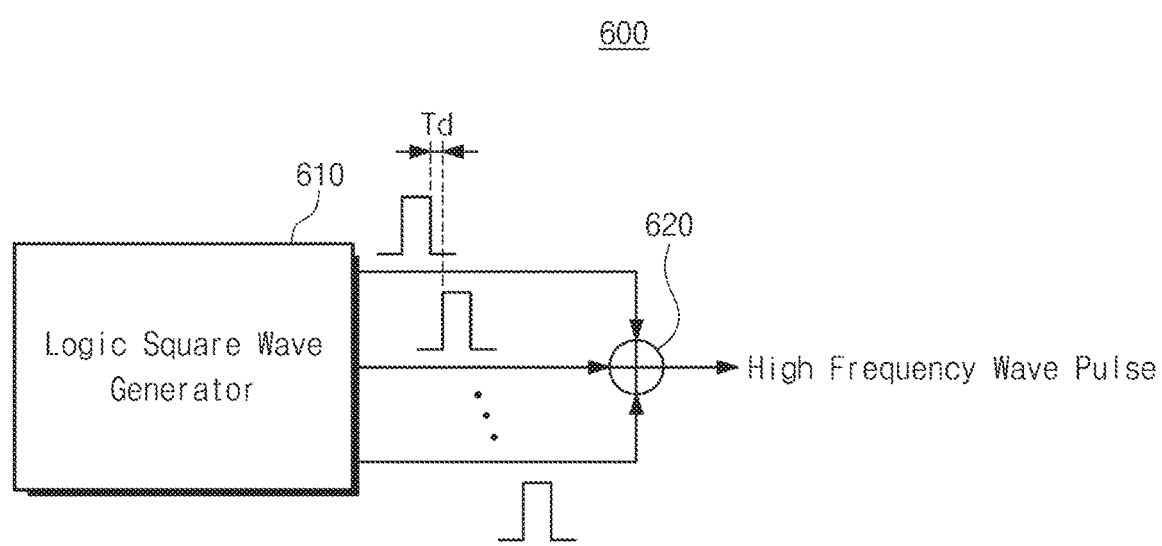
FIG. 16 is a block diagram showing another example of a transmitter usable in the present inventive concept.

FIG. 16 is a block diagram showing another example of a transmitter adoptable in the present inventive concept. Referring to FIG. 16, a transmitter, 600, of the present inventive concept may include a logic square wave generator, 610, and a square wave synthesizer, 620.

The logic square wave generator, 610, may generate a plurality of square waves of which delays, Td, are differently defined. The logic square wave generator, 610, may generate a plurality of square waves by combining, for example, various logic circuits. The square wave synthesizer, 620, may synthesize a plurality of square waves having different delays to generate a high frequency TX pulse. Through such a structure, a multiple-TX unit of the present inventive concept may be provided.

Figure 17:
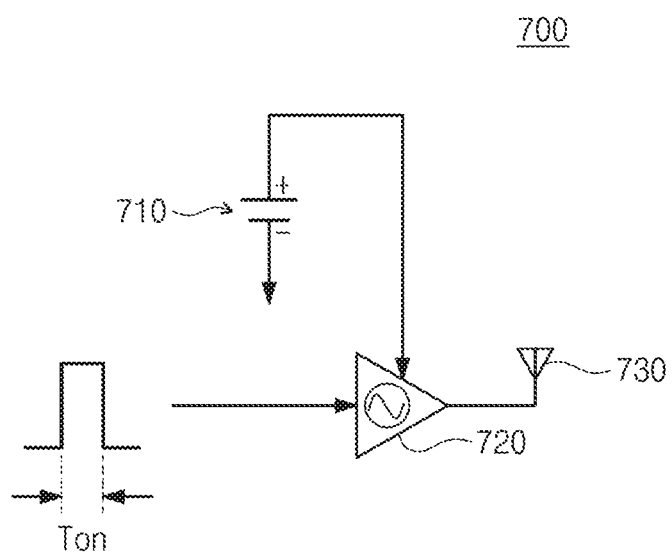
FIG. 17 shows another example of a transmitter usable in the present inventive concept.

FIG. 17 shows another example of a transmitter adoptable in the present inventive concept. Referring to FIG. 17, a transmitter, 700, may include a high voltage source, 710, a TX pulse generator, 720, and a TX antenna, 730.

The high voltage source, 710, may generate a high voltage to provide the high voltage for the TX pulse generator, 720, in order to increase the magnitude of an output pulse signal. The TX pulse generator, 720, may receive a clock signal or on-time signal to generate a high frequency pulse signal. The TX pulse generator, 720, may be realized with, for example, Gallium Nitride (GaN) semiconductor or Gallium Arsenide (GaAs)-based high voltage semiconductor.

According to a pulse radar device according to an embodiment of the present inventive concept, directivity controls of a transmitter and a receiver are enabled by changing a delay between multiple TX clock signals or a delay between multiple RX clock signals. In addition, a pulse radar device of the present inventive concept may adjust a range or position to be scanned by changing the magnitude of the above-described delay between the TX clock signal and RX clock signal.

Accordingly, the pulse radar device of the embodiment of the present inventive concept may flexibly and freely control a pulse radar device by changing a supplied clock signal. In addition, the pulse radar device according to the present inventive concept may enhance the performance by allowing a transmitter and a receiver to have directivities by clock signals. Furthermore, when scanning repetitively a specific position or range, a signal-to-noise ratio of the received signal may be enhanced. For example, an operation may be enabled in a high resolution for a short-range target and in a low resolution for a long-range target through a selection of the position to be scanned. Accordingly, the pulse radar device of the present inventive concept may observe a position or range of interest more finely.

In addition, a pulse radar device of an embodiment of the present inventive concept may use a wideband pulse. Such features enable an easy control for the directivities of the transmitter and receiver without a phase shifter or a true time delay (TTD) device. Accordingly, when the technology of the present inventive concept is applied, the phased array technique may be realized with a simple structure in a wideband pulse radar device.

In addition, it is easy to realize the pulse radar device of the embodiment of the present inventive concept using CMOS technology, etc., which provides merits of integration. When the pulse radar device of the embodiment of the present inventive concept is realized with an on-chip radar system, it is easily achievable for the radar system to have high integration, small area and low power, and high reliability.

A pulse radar device of an embodiment of the present inventive concept may control a magnitude of at least one of a time delay between multiple TX clock signals, a time delay between multiple RX clock signals, or a time delay between a TX clock signal and an RX clock signal to provide a directivity, an increase in signal-to-noise ratio of an RX signal, easiness of control, etc.

A pulse radar device according to technology of the present inventive concept may be realized with on-chip technology to be easily controllable in comparison to the existing technology. Accordingly, the pulse radar device according to technology of the present inventive concept enables realization of a high-directivity pulse radar system of high density integration, miniaturization and low power.

Although the exemplary embodiments of the present invention have been described, it is understood that the present invention may be implemented as other concrete forms without changing the inventive concept or essential features.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A pulse radar device comprising:
   a transmission (TX) unit configured to emit a TX pulse according to a single TX clock signal;
   a multiple-reception (RX) unit configured to receive echo pulses received through a plurality of RX antennas according to multiple RX clock signals; and
   a pulse radar driving unit configured to generate the single TX clock signal and the multiple RX clock signals using a reference clock signal and provide the single TX clock signal and the multiple RX clock signals to the TX unit and the multiple-RX unit,
   wherein the pulse radar driving unit adjusts an RX clock delay between the multiple RX clock signals so as to adjust a directivity of the multiple-RX unit, and a TX-to-RX delay between the single TX clock signal and the multiple RX clock signals so as to adjust a detection range.

2. The pulse radar device of claim 1, wherein the TX unit comprises:
   a transmitter configured to accept the single TX clock signal to generate a pulse signal; and
   a TX antenna configured to emit the pulse signal from the transmitter.

3. The pulse radar device of claim 1, wherein the multiple-RX unit comprises:
   a plurality of RX antennas configured to receive the echo pulses; and
   a plurality of receivers configured to receive signals from the plurality of RX antennas, wherein each of the plurality of receivers is configured to accept one of the multiple RX clock signals,
   wherein, a first RX clock signal is applied to a first receiver among the plurality of receivers, and a second RX clock signal is applied to a second receiver adjacent to the first receiver, and
   the directivity of the multiple-RX unit is adjusted through a magnitude adjustment of a first RX clock-to-clock delay that is a delay between the first RX clock signal and the second RX clock signal.

4. The pulse radar device of claim 3, wherein the pulse radar driving unit adjusts the first RX clock-to-clock delay to be increased or decreased, the first RX clock-to-clock delay to be '0', or a sequential relationship of the first RX clock signal and the second RX clock signal to be reversed.

5. The pulse radar device of claim 4, wherein a third RX clock signal is provided to a third receiver adjacent to the second receiver from among the plurality of receivers, and a second RX clock-to-clock delay between the second RX clock signal and the third RX clock signal is equal to or different from the first RX clock-to-clock delay.

6. The pulse radar device of claim 3, wherein each of the plurality of receivers comprises:

a low noise amplifier configured to amplify an RX signal received by any one of the plurality of RX antennas; and a broadband sampler configured to receive one of the multiple RX clock signals to sample the amplified RX signal.

7. The pulse radar device of claim 1, wherein the pulse radar driving unit comprises:

a clock generator configured to generate the single TX clock signal and the multiple RX clock signals from the reference clock signal; and a signal processor configured to process an RX signal provided from the multiple-RX unit to analyze at least one of a target position, a target type, or a distance to the target.

8. The pulse radar device of claim 7, wherein the clock generator comprises a phase locked loop (PLL), or a delay locked loop (DLL) comprising a voltage controlled delay line (VCDL) for setting a delay relationship from the reference clock to generate the single TX clock signal or the multiple RX clock signals.

9. The pulse radar device of claim 1, wherein a magnitude of the TX-to-RX delay is increased or decreased for selecting the detection range, and radar operation is performed twice or more at a specific TX-to-RX delay for enhancing RX sensitivity for a specific range.

10. A pulse radar device comprising:

a TX unit configured to emit a TX pulse according to TX clock signals;

an RX unit configured to receive an echo pulse according to RX clock signals; and a pulse radar driving unit configured to generate the TX clock signals and the RX clock signals using a reference clock signal, and provide the TX clock signals and the RX clock signals for the TX unit and the RX unit, wherein the pulse radar driving unit adjusts a TX clock-to-clock delay of the TX clock signals so as to adjust a directivity of the TX pulse.

11. The pulse radar device of claim 10, wherein the TX clock signals are multiple TX clock signals, and the TX unit comprises:

a plurality of transmitters configured to accept one of the multiple TX clock signals to generate pulse signals; and a plurality of TX antennas configured to emit the pulse signals from respective outputs of the plurality of transmitters, wherein, a first TX clock signal is applied to a first transmitter among the plurality of transmitters, and a second TX clock signal is applied to a second transmitter adjacent to the first transmitter, and the directivity of the TX pulse is adjusted through a magnitude adjustment of a first TX clock-to-clock delay that is a delay between the first TX clock signal and the second TX clock signal.

12. The pulse radar device of claim 11, wherein the pulse radar driving unit adjusts the first TX clock-to-clock delay to be increased or decreased, the first TX clock-to-clock delay to be '0', or a sequential relationship of the first TX clock signal and the second TX clock signal to be reversed.

13. The pulse radar device of claim 12, wherein a third TX clock signal is provided to a third transmitter adjacent to the second transmitter from among the plurality of transmitters, and a second TX clock-to-clock delay between the second TX clock signal and the third TX clock signal is equal to or different from the first TX clock-to-clock delay.

14. The pulse radar device of claim 11, wherein each of the plurality of transmitters comprises:

a changeable delay generator configured to accept one of the multiple TX clock signals to generate an on-time signal; and an oscillator being activated during a pulse duration defined by the on-time signal.

15. The pulse radar device of claim 10, wherein the RX unit is a multiple-RX unit, and the pulse radar driving unit adjusts an RX clock-to-clock delay of the RX clock signals so as to adjust a directivity of the multiple-RX unit, and RX clock-to-clock delays between a plurality of different RX clock signals are equal to or different from each other.

16. The pulse radar device of claim 10, wherein the pulse radar driving unit adjusts a TX-to-RX delay of the TX clock signals and the RX clock signals so as to select a detection range, and performs radar operation twice or more with a specific TX-to-RX delay magnitude so as to enhance RX sensitivity for a specific range.

17. An operation method of a pulse radar device receiving RX pulses using a plurality of RX antennas, the operation method comprising:

setting a magnitude of a TX-to-RX delay between a TX clock signal and multiple RX clock signals or a magnitude of an RX clock-to-clock delay of a plurality of RX clock signals included in the multiple RX clock signals so as to receive the RX pulses;

performing a radar scan according to the set TX-to-RX delay and the set RX clock-to-clock delay; and analyzing at least one of a position, a distance, or a type of a target using a result of the radar scan;

wherein the RX clock-to-clock delay is a value for adjusting an RX directivity and RX clock-to-clock delays between a plurality of different RX clock signals are equal to or different from each other.

18. The operation method of claim 17, wherein the magnitude of the TX-to-RX delay is a value for selecting a detection range, the magnitude of the TX-to-RX delay increases or decreases, the radar scan is repeatedly performed twice or more with a specific TX-to-RX delay magnitude for raising an RX sensitivity for a specific range.

19. The operation method of claim 17, further comprising:

setting, by the pulse radar device, a magnitude of a TX clock-to-clock delay of a plurality of TX clock signals included in multiple TX clock signals, wherein the pulse radar device comprises multiple TX antennas and the TX clock signal is the multiple TX clock signals for controlling a directivity of a TX pulse.

* * * * *